United States Patent
Bettappanavar et al.

(10) Patent No.: US 12,532,284 B2
(45) Date of Patent: Jan. 20, 2026

(54) METHODS AND SYSTEMS FOR ENABLING MULTI-SIM UE TO PERFORM FASTER CAMPING IN WIRELESS COMMUNICATION SYSTEM

(71) Applicant: Samsung Electronics Co., Ltd., Suwon-si (KR)

(72) Inventors: Arunakumar Bettappanavar, Bengaluru (IN); Meha Goel, Bengaluru (IN); Shrinath Ramamoorthy Madhurantakam, Bengaluru (IN); Akshay Rastogi, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 796 days.

(21) Appl. No.: 17/722,618

(22) Filed: Apr. 18, 2022

(65) Prior Publication Data

US 2023/0269688 A1    Aug. 24, 2023

(30) Foreign Application Priority Data

Feb. 22, 2022    (IN) .............................. 202241009268

(51) Int. Cl.
| | | |
|---|---|---|
| *H04W 60/00* | (2009.01) | |
| *H04W 24/08* | (2009.01) | |
| *H04W 72/23* | (2023.01) | |
| *H04W 88/06* | (2009.01) | |

(52) U.S. Cl.
CPC ........... *H04W 60/00* (2013.01); *H04W 24/08* (2013.01); *H04W 72/23* (2023.01); *H04W 88/06* (2013.01)

(58) Field of Classification Search
CPC ........ H04L 41/16; H04L 41/12; H04W 72/20; H04W 72/563; H04W 36/14; H04W 36/0061; H04W 36/0069; H04W 36/0088; H04W 76/28
See application file for complete search history.

(56) References Cited

U.S. PATENT DOCUMENTS

| | | |
|---|---|---|
| 2013/0235740 A1 | 9/2013 | Kim et al. |
| 2015/0110073 A1 | 4/2015 | Cili et al. |
| (Continued) | | |

FOREIGN PATENT DOCUMENTS

| | | |
|---|---|---|
| CN | 111698772 A | 9/2020 |
| WO | WO-2019-075598 A1 | 4/2019 |

OTHER PUBLICATIONS

"Discussion on LS about interworking between 5G System and legacy RATs", Mediatek Inc, vol. RAN WG4, (Jan. 15, 2018), XP051387852.

(Continued)

*Primary Examiner* — Iqbal Zaidi
(74) *Attorney, Agent, or Firm* — Harness, Dickey & Pierce, P.L.C.

(57) ABSTRACT

A method disclosed herein includes registering, by a User Equipment (UE), with a primary cell of a first Radio Access Technology (RAT) after terminating at least one communication service initiated in a second RAT, and initiating, by the UE, Inter-Radio Access Technology (IRAT) measurement of a secondary cell before receiving a reconfiguration message from the primary cell in response to the registering, the secondary cell being associated with the primary cell.

20 Claims, 21 Drawing Sheets

(56) References Cited

U.S. PATENT DOCUMENTS

| | | | | |
|---|---|---|---|---|
| 2016/0165604 A1* | 6/2016 | Khawer | ............... | H04L 5/0098 455/452.1 |
| 2018/0132289 A1 | 5/2018 | Zhao et al. | | |
| 2019/0098684 A1 | 3/2019 | Tamura | | |
| 2020/0329338 A1* | 10/2020 | Lovlekar | ............... | H04W 76/19 |
| 2020/0383010 A1 | 12/2020 | Zhu et al. | | |
| 2021/0051529 A1 | 2/2021 | Yuan et al. | | |
| 2023/0247511 A1* | 8/2023 | Kumar | ............... | H04W 52/241 455/436 |

OTHER PUBLICATIONS

EESR dated May 23, 2023 for corresponding EP Patent Application No. 22188092.5.

Indian Office Action, dated Mar. 18, 2024, issued in Indian Patent Application No. 202241009268.

\* cited by examiner

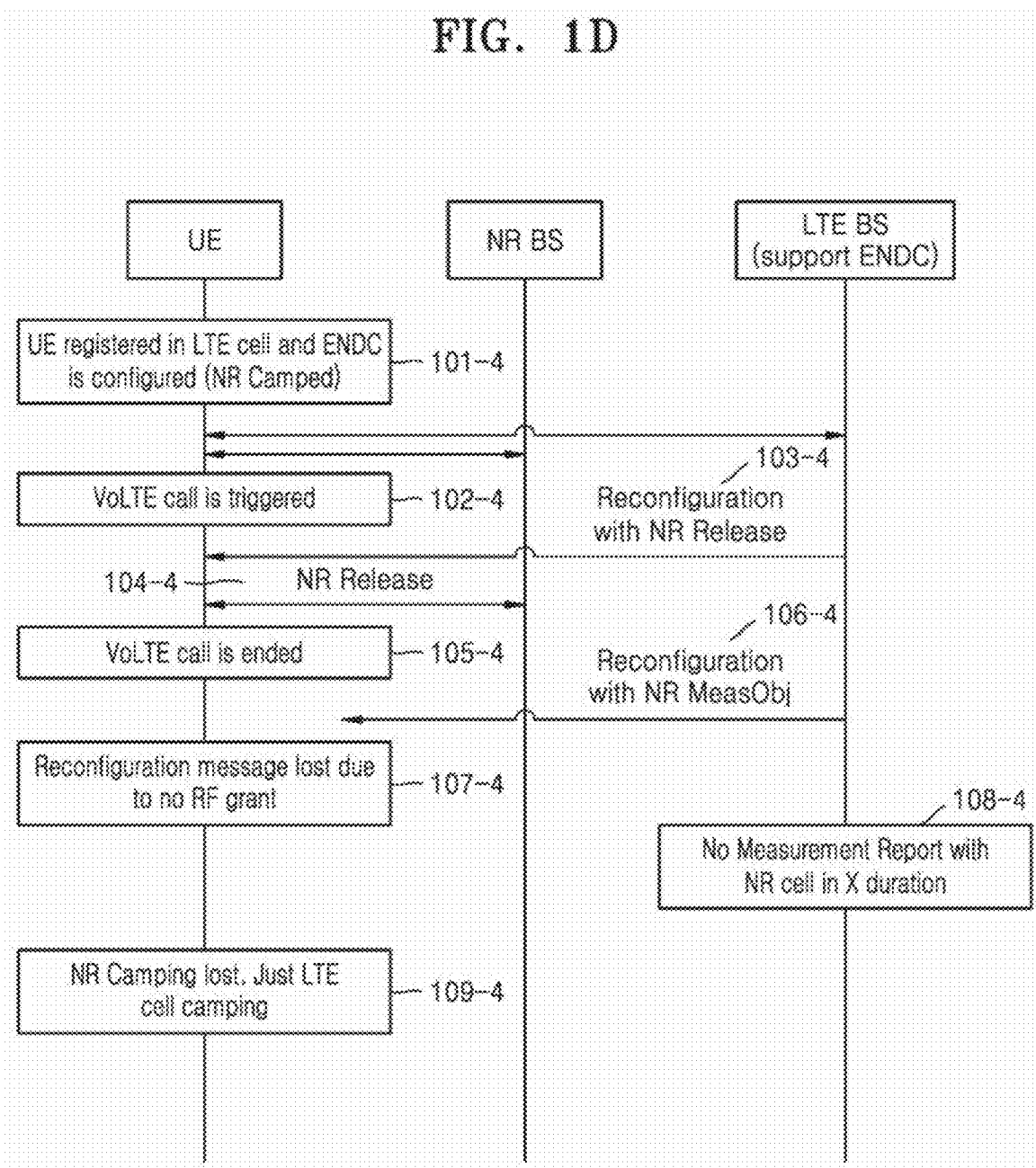

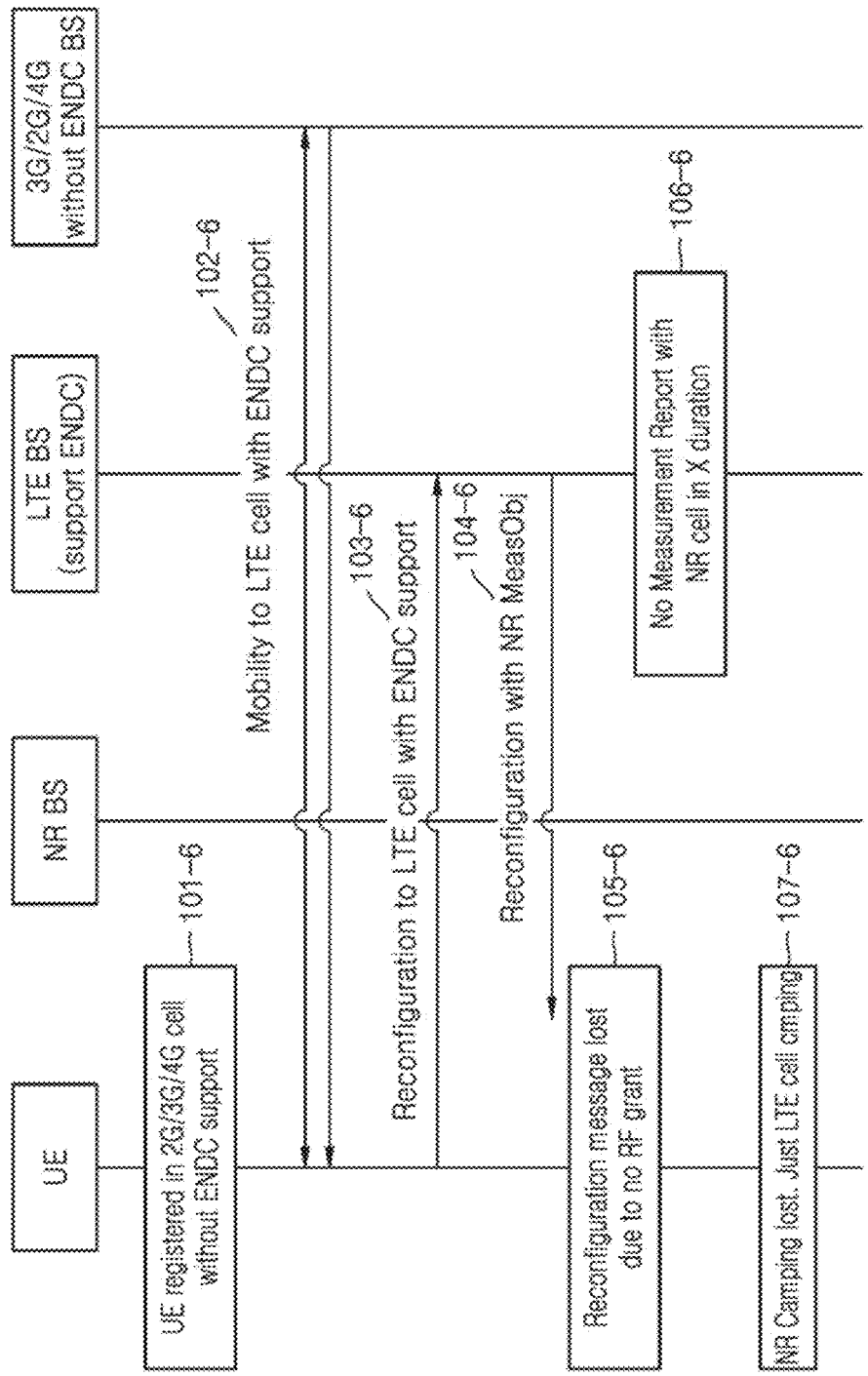

METHODS AND SYSTEMS FOR ENABLING MULTI-SIM UE TO PERFORM FASTER CAMPING IN WIRELESS COMMUNICATION SYSTEM

This application is based on and claims priority under 35 U.S.C. § 119 to Indian Patent Application No. 202241009268, filed on Feb. 22, 2022 in the Indian Intellectual Property Office, the disclosure of which is incorporated by reference herein in its entirety.

The following specification particularly describes and ascertains the nature of the inventive concepts and the manner in which they may be performed.

TECHNICAL FIELD

The present disclosure relates to the field of wireless communication systems and more particularly to enabling multi-Subscriber Identity Module (SIM) User Equipment (UE) to perform faster camping in a wireless communication system.

BACKGROUND

Wireless communication systems are constantly evolving to provide different kinds of services supported by different Radio Access Technologies (RATs) to different User Equipments (UEs). From a UE point of view, the UE camps on a latest RAT to obtain the better service. Also, from a network deployment point of view, the UE interworks with legacy RATs or fallback to legacy RATs for specific services. In such scenarios, the UE may stay in the legacy RAT for a longer period of time despite the availability of the latest RAT, especially when the UE is a multi-Subscriber Identity Module (SIM) UE or a dual SIM dual standby (DSDS) UE.

Consider an example scenario, as depicted in FIG. 1A, wherein the UE initially camps on a cell of a Long-Term Evolution (LTE) network (an example RAT) (hereinafter referred as an LTE cell/Base Station or an eNodeB (eNB)) with an E-UTRAN New Radio—Dual Connectivity (ENDC) configuration (at operation 101-1). Due to Circuit Switched FallBack (CSFB), the UE moves to a 3G/2G network for the specific service (for example: for a voice call) (at operations 102-1, 103-1, and 104-1). Upon an end of the voice call, the UE comes back to the LTE BS (at operations 105-1, and 106-1). The LTE BS configures a New Radio (NR) Inter-RAT (IRAT) measurement object (at operations 107-1 and 108-1). Due to Radio Frequency (RF) grant unavailability in the UE (e.g., the multi-SIM UE), the UE is not able to send a measurement report to the LTE BS within a pre-defined or alternatively, given duration (e.g., the UE may send the measurement report to the LTE BS with a delay) (at operation 109-1). The LTE BS waits for the pre-defined or alternatively, given duration and releases the NR IRAT measurement object for the UE (at operations 110-1 and 111-1). Therefore, the UE stays in the LTE only (the legacy RAT) despite the availability of the NR (the latest RAT) (at operation 112-1).

Consider an example scenario, as depicted in FIG. 1B, wherein the UE initially camps on the LTE cell/BS with the ENDC configuration (at operation 101-2). Due to the CSFB, the UE moves to the 3G/2G network for the specific service (for example: for a voice call) (at operations 102-2, 103-2, and 104-2). Upon the end of the voice call, the UE comes back to the LTE BS (at operations 105-2 and 106-2). The LTE BS sends a reconfiguration message with the NR IRAT measurement object to the UE (at operation 107-2). Due to the RF grant unavailability in the UE, the UE does not receive the reconfiguration message from the LTE BS and does not send the measurement report to the LTE BS (at operation 108-2, and 109-2). The LTE BS does not configure a cell of the NR (NR cell) for the UE, as the LTE BS does not receive the measurement report from the UE (at operation 110-2). Therefore, the UE stays in the LTE only (the legacy RAT) despite the availability of the NR (the latest RAT) (at operation 111-2).

Consider another example scenario, as depicted in FIG. 1C, wherein the UE initially camps on the LTE cell/BS with the ENDC configuration (at operation 101-3). Due to a Voice over LTE (VoLTE) call (an example of the service provided by the LTE network); the LTE BS releases a NR configuration for the UE (at operations 102-3, 103-3, and 104-3). After the VoLTE call, the LTE BS configures the NR IRAT measurement object for the UE (at operations 105-3, and 106-3). Due to the RF grant unavailability, the UE is not able to send the measurement report to the LTE BS within the pre-defined or alternatively, given duration (e.g., the UE may send the measurement report to the LTE cell with delay) (at operation 107-3). The LTE BS waits for the pre-defined or alternatively, given duration and releases the NR IRAT measurement object for the UE (at operations 108-3 and 109-3). Therefore, the UE stays in the LTE only (the legacy RAT) despite the availability of the NR (the latest RAT) (at operation 110-3).

Consider another example scenario, as depicted in FIG. 1D, wherein the UE initially camps on the LTE cell/BS with the ENDO configuration (at operation 101-4). Due to the VoLTE call, the LTE BS releases the NR configuration for the UE (at operations 102-4, 103-4, and 104-4). After the VoLTE call, the LTE BS sends the reconfiguration message with the NR IRAT measurement object to the UE (at operations 105-4, and 106-4). Due to the RF grant unavailability in the UE, the UE does not receive the reconfiguration message from the LTE BS and does not send the measurement report to the LTE BS (at operation 107-4). The LTE BS does not configure the NR cell for the UE, as the LTE BS does not receive the measurement report from the UE (at operation 108-4). Therefore, the UE stays in the LTE only (the legacy RAT) despite the availability of the NR (the latest RAT) (at operation 109-4).

Consider another example scenario, as depicted in FIG. 1E, wherein the UE moves to the LTE cell/BS that supports the ENDO configuration through mobility from the 2G/3G/4G cell without ENDO support (at operation 101-5). In such a scenario, the LTE BS configures the NR IRAT measurement object for the UE (at operations 102-5, 103-5, and 104-5). Due to the RF grant unavailability, the UE is not able to send the measurement report to the LTE BS within the pre-defined or alternatively, given duration (at operation 105-5). The LTE BS waits for the pre-defined or alternatively, given duration and releases the NR IRAT measurement object for the UE (at operations 106-5, and 107-5). Therefore, the UE stays in the LTE only (the legacy RAT) despite the availability of the NR (the latest RAT) (at operation 108-5).

Consider an example scenario, as depicted in FIG. 1F, wherein the UE moves to the LTE cell/BS that supports the ENDO configuration through mobility from the 2G/3G/4G cell without ENDO support (at operation 101-6). Due to the RF grant unavailability in the UE, the UE does not receive the reconfiguration message from the LTE BS and does not send the measurement report to the LTE BS (at operations 102-6, 103-6, and 104-6). The LTE BS does not configure the NR cell for the UE, as the LTE BS does not receive the measurement report from the UE (at operations 105-6, and 106-6). Therefore, the UE stays in the LTE only (the legacy RAT) despite the availability of the NR (the latest RAT) (at operation 107-6).

Consider another example scenario, as depicted in FIG. 1G, wherein the UE initially camps onto a NR cell/gNodeB (gNB)/SA with a NR-Evolved Universal Terrestrial Radio Access (EUTRA)-DC (NEDC) configuration (at operation 101-7). Due to Voice over 5G New Radio (VoNR)/EPSFB call (an example of the service provided by the NR network) the network releases an LTE configuration (at operations 102-7, 103-7, and 104-7). After the VoNR/EPSFB call, the NR BS configures the LTE IRAT measurement object for the UE (at operations 105-7, 106-7 and 107-7). Due to the RF grant unavailability, the UE is not able to send the measurement report to the NR BS within the pre-defined or alternatively, given duration (at operation 108-7). The NR BS does not configure the LTE cell for the UE, as the NR BS does not receive the measurement report from the UE within the pre-defined or alternatively, given duration (at operations 109-7 and 110-7). Therefore, the UE stays in the NR only (at operation 111-7).

Consider another example scenario, as depicted in FIG. 1H, wherein the UE initially camps onto the NR cell/gNodeB (gNB)/SA with the NEDC configuration (at operation 101-8). Due to the VoNR/EPSFB call, the network releases the LTE configuration (at operations 102-8, 103-8, and 104-8). After the VoNR/EPSFB call, the NR BS sends the reconfiguration message with the LTE IRAT measurement object to the UE (at operations 105-8 to 107-8). Due to the RF grant unavailability, the UE does not receive the reconfiguration message from the NR BS and does not send the measurement report to the NR BS (at operation 108-8). The NR BS does not configure the LTE cell for the UE, as the NR BS does not receive the measurement report from the UE (at operations 109-8 and 110-8). Therefore, the UE stays in the NR only (at operation 111-8).

Consider another example scenario, wherein the UE supports multiple Subscriber Identity Modules (SIMs), and a single RF chain is being shared among the multiple SIMs. In such a scenario, when a SIM 1 is in a connected state and a SIM 2 takes away the RF grant, the SIM 1 may miss the reconfiguration message including the IRAT measurement configurations or the reconfiguration message including a Secondary Cell Group (SCG) configuration related to the secondary cell, so that the SIM 1 may miss the SCG configuration.

SUMMARY

Embodiments herein provide methods and systems for enabling a User Equipment (UE) to perform faster camping in a wireless communication system.

Embodiments herein provide methods and systems for enabling the UE to camp on a secondary cell by performing Inter-Radio Access Technology (RAT) measurements, while waiting to receive a reconfiguration message from an associated primary cell.

Embodiments herein provide methods and systems for enabling the UE to camp on the secondary cell by reserving a Radio Frequency (RF) grant, while waiting to receive the reconfiguration message from the associated primary cell.

Embodiments herein provide methods and systems for enabling the UE to reserve the RF grant to camp on the secondary cell, based on an indication about a follow-on Radio Resource Control (RRC) procedure received from the primary cell.

Embodiments herein provide methods and systems for enabling the UE to reserve the RF grant to camp on the secondary cell based on a duty cycle of multiple stacks.

Accordingly, embodiments herein provide methods and systems for performing camping in a wireless communication system. A method disclosed herein includes registering, by a User Equipment (UE), with a primary cell of a first Radio Access Technology (RAT) after terminating at least one communication service initiated in a second RAT, and initiating, by the UE, Inter-Radio Access Technology (IRAT) measurement of a secondary cell before receiving a reconfiguration message from the primary cell in response to the registering, the secondary cell being associated with the primary cell.

Accordingly, embodiments herein provide a User Equipment (UE) in a wireless communication system. The UE includes processing circuitry configured to register with a primary cell of a first Radio Access Technology (RAT) after terminating at least one communication service initiated in a second RAT, and initiate Inter-Radio Access Technology (IRAT) measurement of a secondary cell before receiving a reconfiguration message from the primary cell in response to the registration, the secondary cell being associated with the primary cell.

These and other aspects of embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of embodiments herein without departing from the spirit thereof, and embodiments herein include all such modifications.

BRIEF DESCRIPTION OF FIGURES

Embodiments herein are illustrated in the accompanying drawings, throughout which like reference letters indicate corresponding parts in the various figures. Embodiments herein will be better understood from the following description with reference to the drawings, in which:

FIGS. 1A-1H are example use case scenarios depicting camping of a User Equipment (UE) on a legacy Radio Access Technology (RAT) despite availability of a latest RAT;

DETAILED DESCRIPTION

Figure 1A:
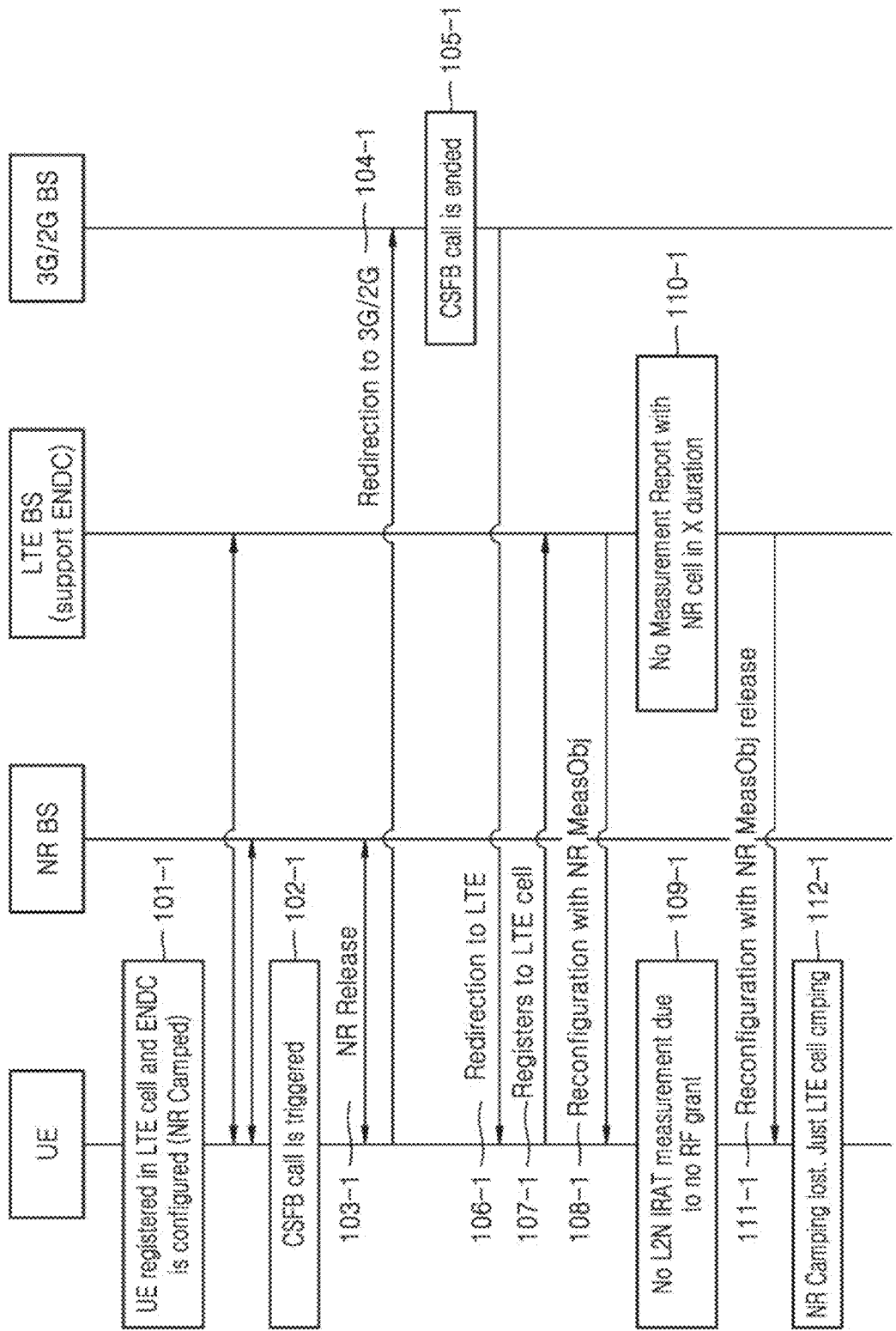
Figure 1B:
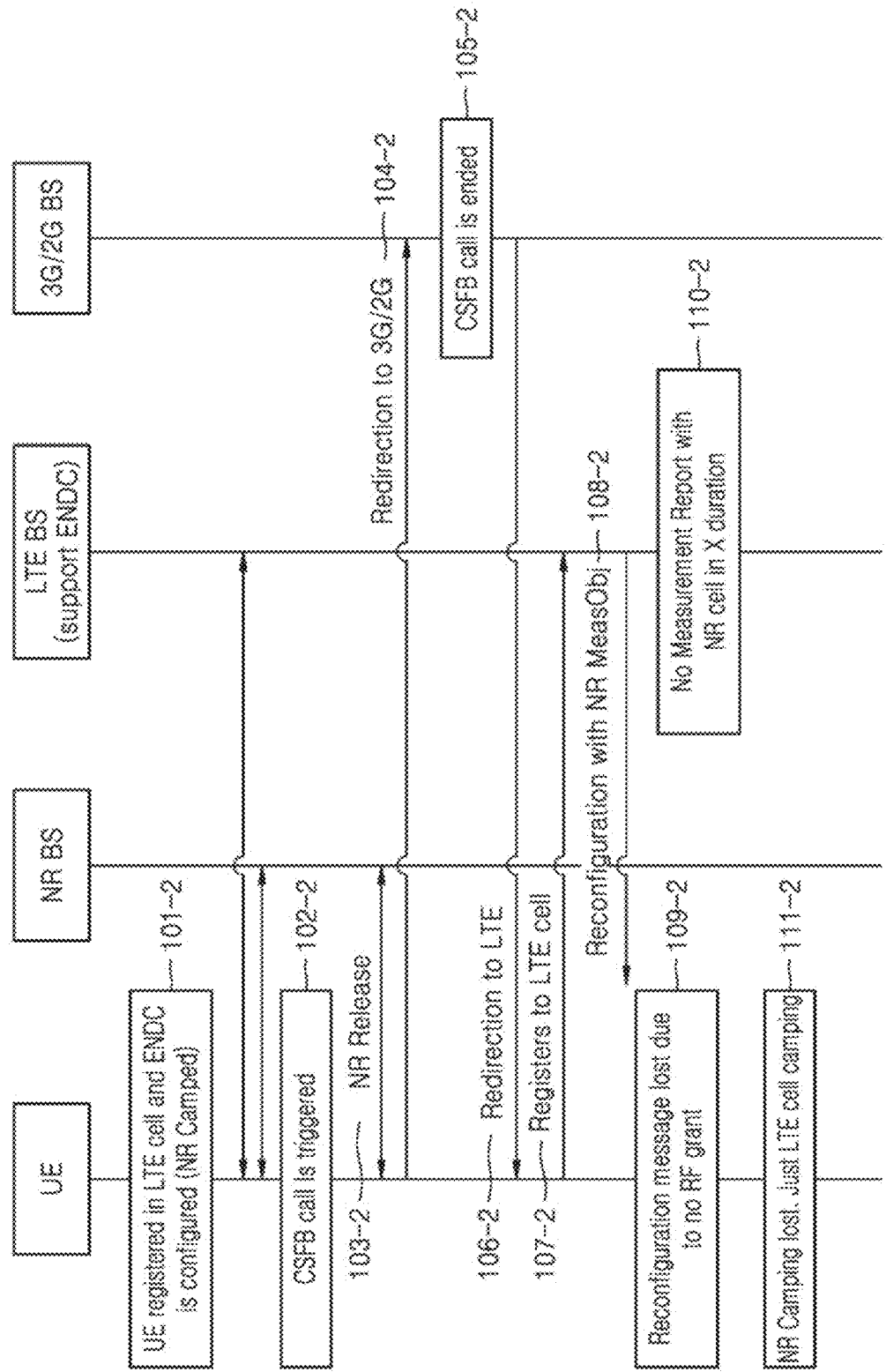
Figure 1C:
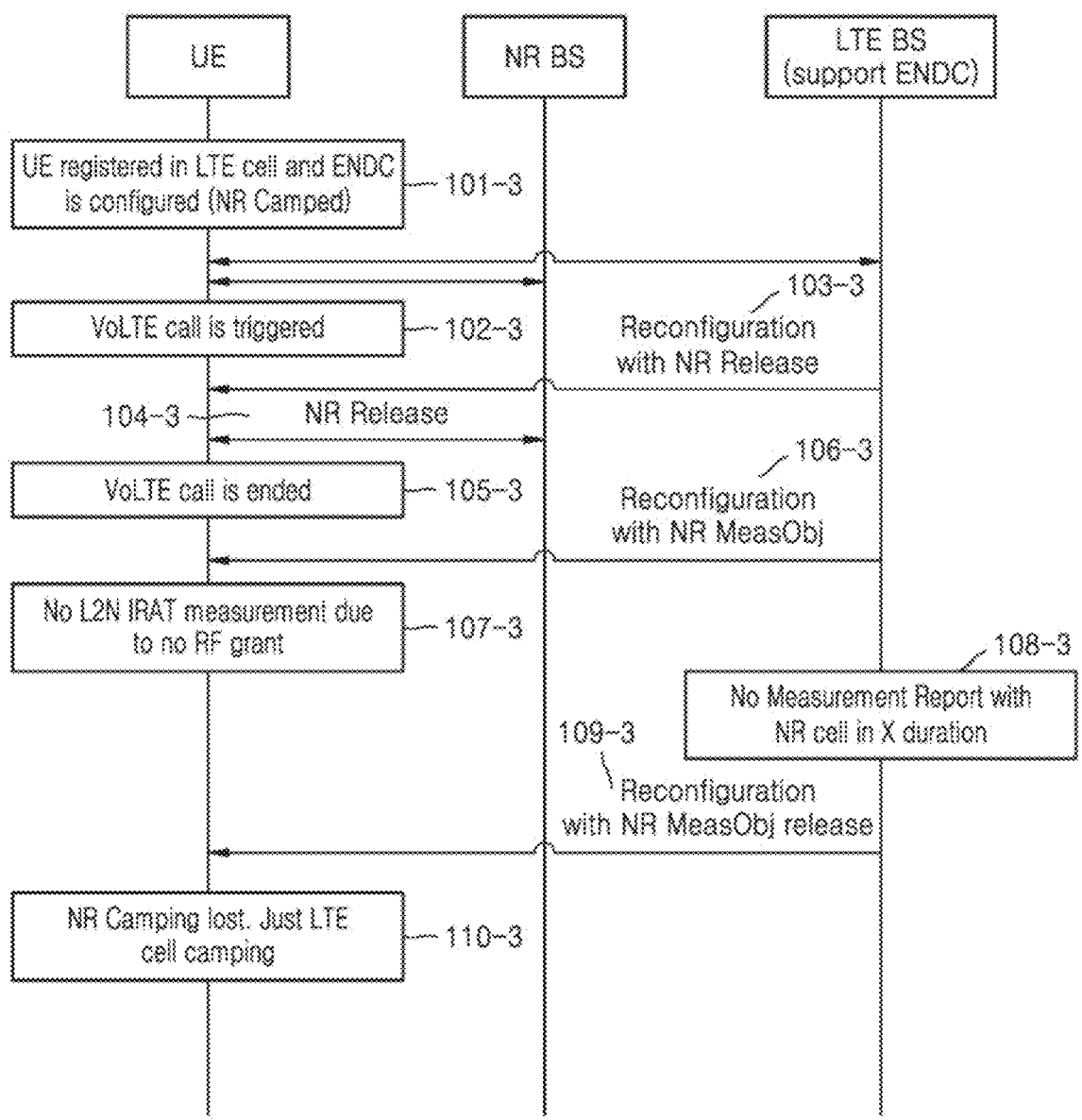
Figure 1E:
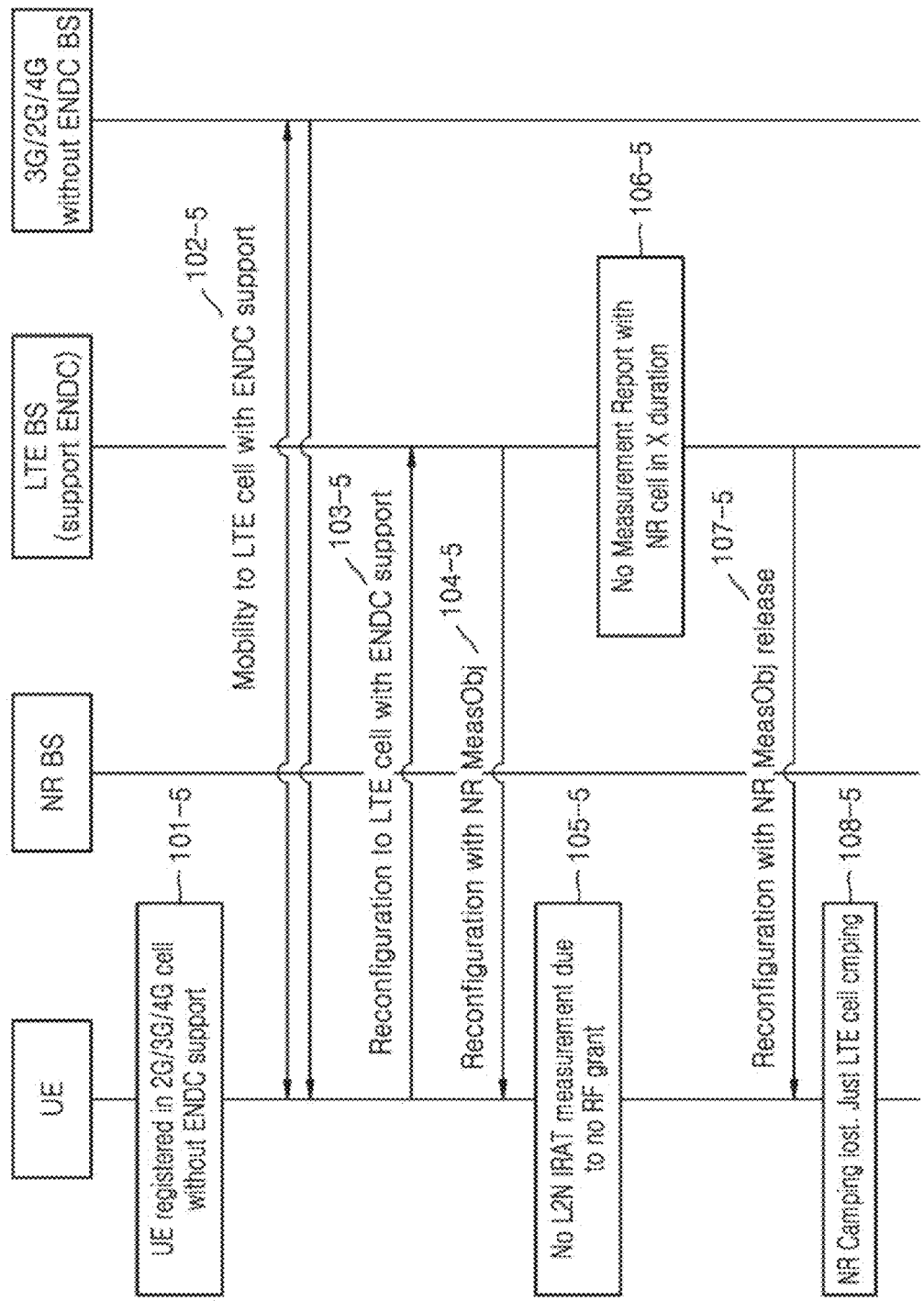
Figure 1G:
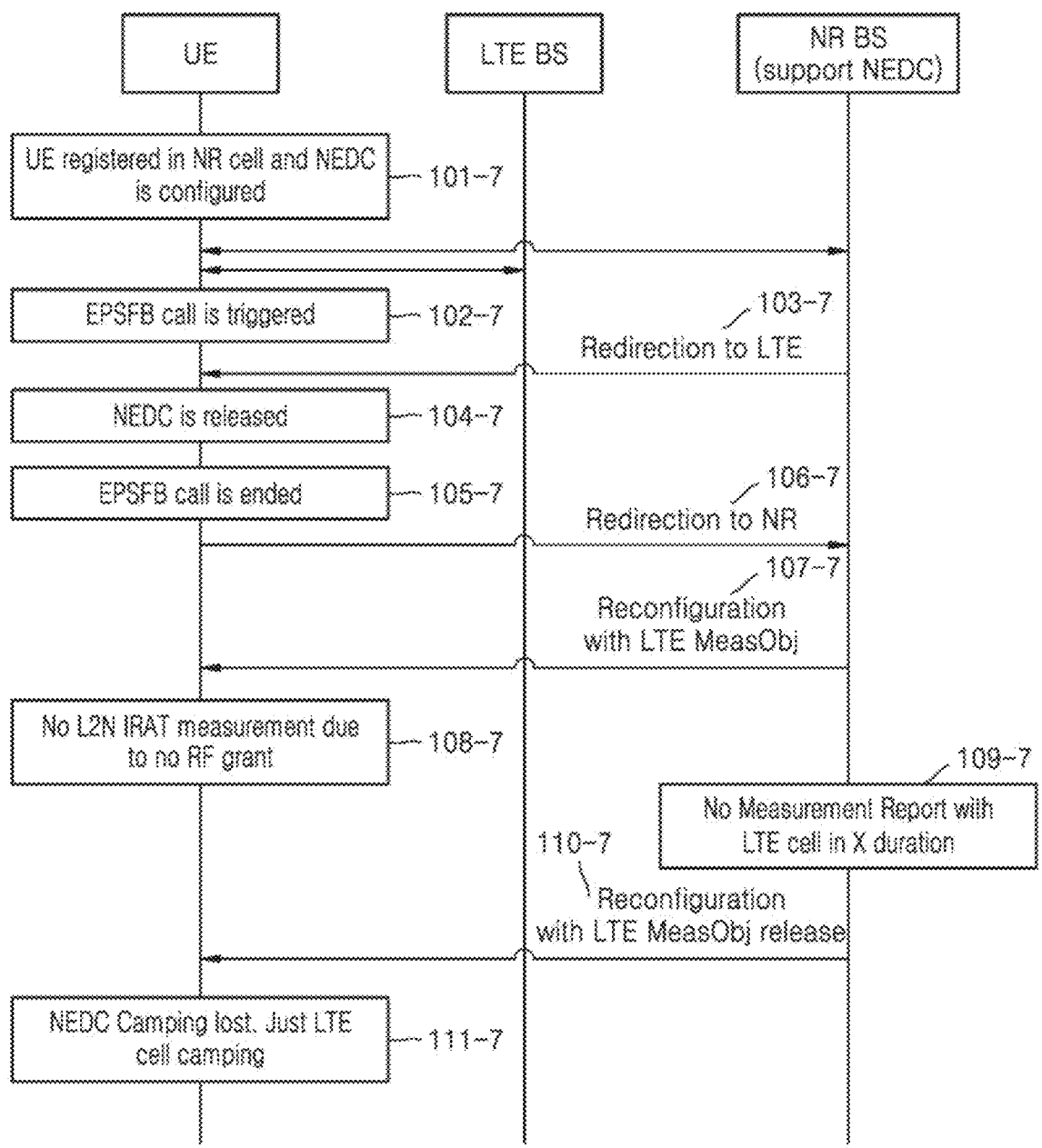
Figure 1H:
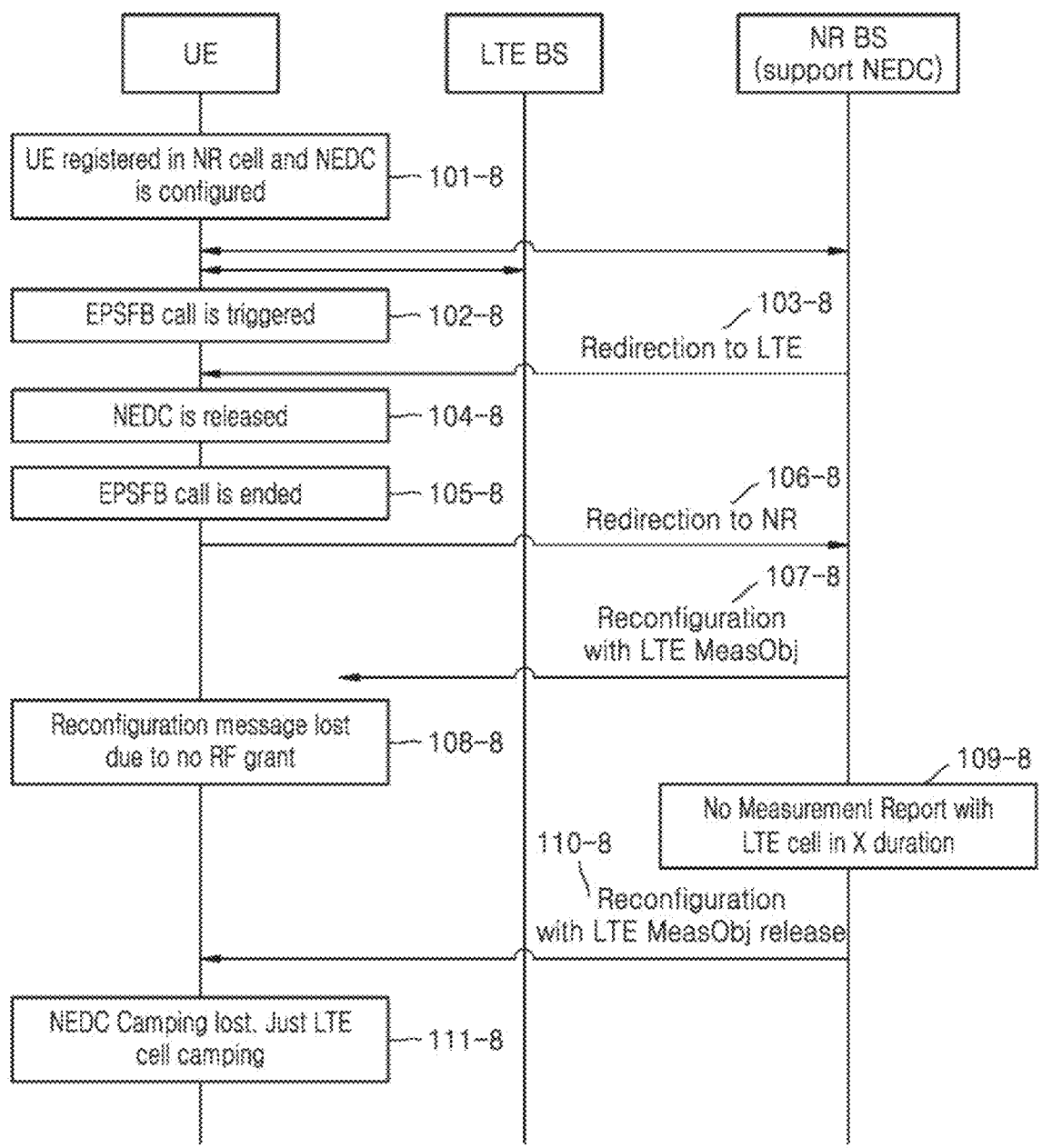

Embodiments herein and the various features and advantageous details thereof are explained more fully with reference to the non-limiting examples that are illustrated in the accompanying drawings and detailed in the following description. Descriptions of well-known components and processing techniques are omitted so as to not obscure embodiments herein. The description herein is intended merely to facilitate an understanding of ways in which embodiments herein may be practiced and to further enable those of skill in the art to practice embodiments herein. Accordingly, this disclosure should not be construed as limiting the scope of embodiments herein.

Embodiments herein provide methods and systems for enabling multi-Subscriber Identity Module (SIM) User Equipment (UE) to perform faster camping in a wireless communication system. Referring now to the drawings, and more particularly to FIGS. 2 through 14, where similar reference characters denote corresponding features consistently throughout the figures, there are shown embodiments.

Figure 2:
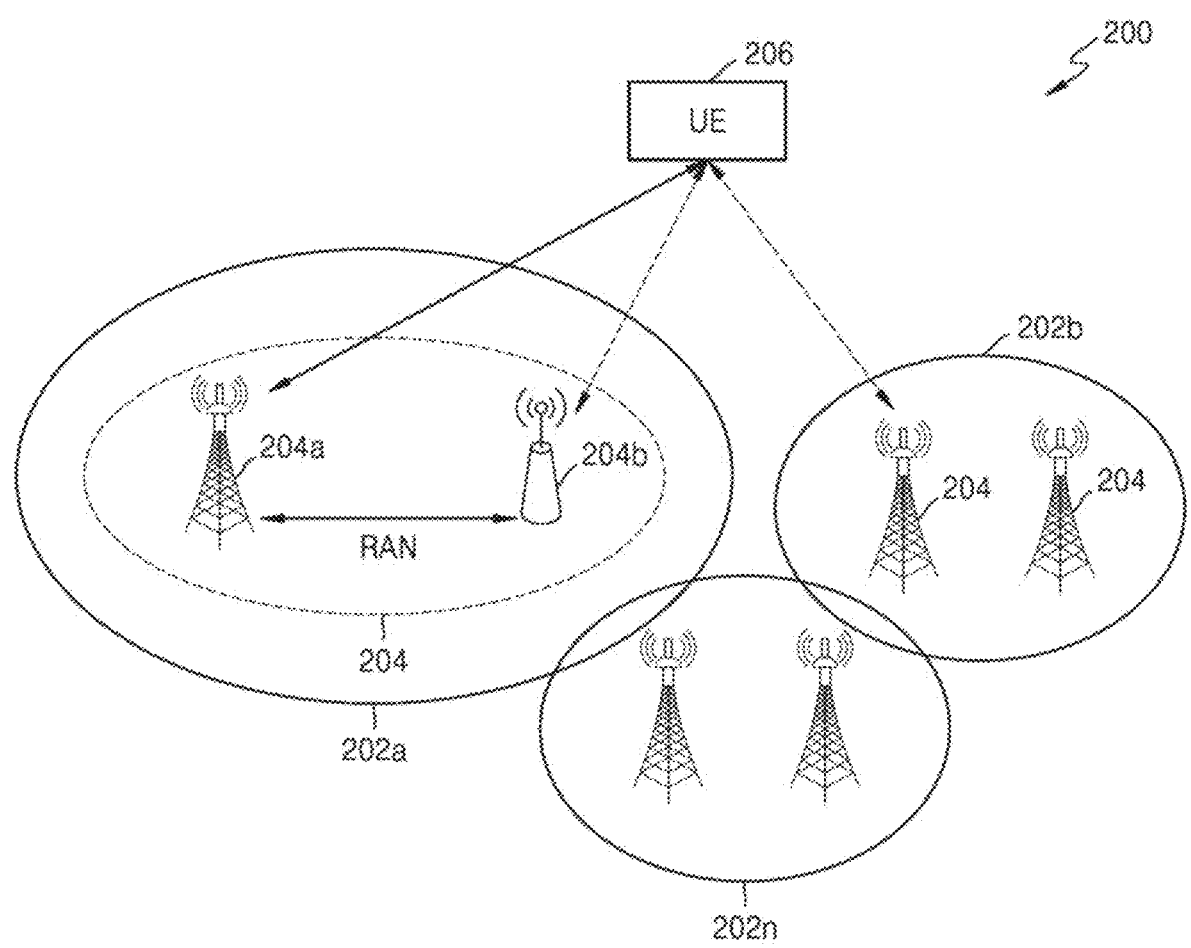
FIG. 2 depicts a wireless communication system, according to embodiments as disclosed herein.

FIG. 2 depicts a wireless communication system 200, according to embodiments as disclosed herein.

The wireless communication system 200 referred herein supports different modes of Dual Connectivity (DC) across different Radio Access Technologies (RATs). In an example, the wireless communication system 200 supports a Multi-RAT DC (MRDC) (e.g., the DC is between the different RATs).

The wireless communication system 200 includes a plurality of RATs 202a-202n (e.g., the RAT 202a, the RAT 202b and the RAT 202n), and at least one User Equipment (UE) 206.

The plurality of RATs 202a-202n may be configured to provide communication services to the UE 206. Examples of the RATs may be, but are not limited to, a 2G network, a 3G network, a Long Term Evolution (LTE)/4G, an LTE-Advanced (LTE-A), a Fifth Generation (5G) New Radio (NR), a Wireless Local Area Network (WLAN), Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Wireless Local Area Network (WLAN), Worldwide Interoperability for Microwave Access (WiMAX/IEEE 802.16), Wi-Fi (IEEE 802.11), Evolved-UTRA (E-UTRA), Wi-Fi Direct, or any other next generation networks or wireless networks. Examples of the communication services may be, but are not limited to, a streaming service (streaming of multimedia data such as audio, video, text and so on), a call related service, a file download service, a carousel service (combining file download service and streaming service), a television (TV) service, a media on demand service, and so on.

In embodiments, at least one of the plurality of RATs 202a-202n may or may not support the DC. In an example, the RAT 202a supporting the DC may include at least one of, an LTE supporting Evolved UMTS Terrestrial Radio Access Network (E-UTRAN)—New Radio (NR) Dual connectivity (DC) (ENDC), a NR supporting NR-Evolved Universal Terrestrial Radio Access (EUTRA)-DC (NEDC), and so on. In an example, the RAT 202b may include at least one of, a 3G network, a 2G network, a LTE, and so on, without supporting the DC.

Each RAT (202a-202n) may include a Radio Access Network (RAN) 204. The RAN 204 referred herein may include one or more Base Stations (BSs)/nodes of different RATs supporting the DC. Examples of the nodes may be, but are not limited to, eNodeBs (eNBs), gNodeBs (gNBs), and so on. The BS/node may connect the one or more UEs 206 to a core network (CN) (not shown) for the communication services.

To achieve the DC, the RAN 204 of the at least one RAT (for example: 202a) supporting the DC may support a bearer split functionality, which enables the RAN 204 to split a bearer over multiple BSs/nodes. In an example, as depicted in FIG. 2, the RAN 204 of the RAT 202a supporting the DC may support the bearer split functionality over two BSs, for example, a master node (MN) 204a and a secondary node (SN) 204b. The MN 204a may be the BS/node associated with the macro cell, which provides radio resources to the UE 206 by acting as a mobility anchor towards the CN. The SN 204b may be the BS/node associated with the small cell/pico cell, which provides additional radio resources to the UE 206. The MN 204a and the SN 204b may be connected with each other over an interface. In an example, the MN 204a and the SN 204b may be connected over an X2 interface. The MN 204a and the SN 204b may be associated with serving cells/carrier frequencies such as a primary carrier/Master Cell Group (MCG) and a secondary carrier/Secondary Cell Group (SCG), respectively. The MCG and the SCG may be a group of cells associated with the MN 204a and the SN 204b, respectively comprising a primary cell (PCell)/primary SCell (PSCell) and optionally one or more Secondary Cells (SCells). The MN 204a may be configured to add or release the SCGs associated with the SN 204b. Embodiments herein use the terms "MN", "primary cell", "primary BS", and so on, interchangeably to refer to the cell/BS that provides radio resources to the UE 206 by acting as the mobility anchor towards the CN. Embodiments herein use the terms "SN", "secondary cell", "secondary BS", and so on, interchangeably to refer to the cell/BS that provides additional radio resources to the UE 206.

The UE 206 referred to herein may be any device that supports the RAT capable of providing the DC. Examples of the UE 206 may be, but are not limited to, a mobile phone, a smartphone, tablet, a phablet, a personal digital assistant (PDA), a laptop, a computer, a wearable computing device, a vehicle infotainment device, an Internet of Things (IoT) device, a Wi-Fi router, or any other device that supports the at least one RAT capable of providing the DC. In embodiments, the UE 206 is a multi-Subscriber Identity Module (SIM) multi standby UE, which supports multiple SIMs/stacks. The multiple SIMs may support the same, similar or different RATs.

The UE 206 may be configured to camp and connect with the one or more cells/BSs of the different RATs 202a-202n to obtain the communication services.

The UE 206 initially camps onto the at least one cell/BS (for example: the primary cell 204a) of a first RAT (for example: the RAT 202a) of the plurality of RATs 202a-202n, which supports the DC. In an example, the first RAT includes at least one of, an LTE supporting the ENDC, the NR supporting the NEDC, and so on. The UE 206 may switch to a second RAT (for example: the RAT 202b) of the plurality of RATs 202a-202n, on initiating the at least one communication service in the second RAT 202b or through mobility from the first RAT 202a. In an example, the second RAT 202b includes at least one of, a 2G network, a 3G network, and so on, without supporting the DC. The UE 206 may switch back to the first RAT 202a and register with the primary cell/BS 204a of the first RAT 202a (e.g., transmit a registration request to the primary cell/BS 204a), on completion/termination of the at least one communication service initiated in the second RAT 202b. In such a scenario, embodiments herein enable the UE 206 to perform faster camping on the secondary cell/BS 204b associated with the first cell/BS 204a of the first RAT 202a.

In an example, the primary cell/BS 204a and the associated secondary cell/BS 204b of the first RAT 202a may include the LTE BS supporting the ENDC, and a NR BS, respectively. In an alternative example, the primary cell/BS 204a and the associated secondary cell/BS 204b of the first RAT 202a may include the NR BS supporting the NEDC, and an LTE BS, respectively.

Embodiments herein enable the UE 206 to camp on the secondary cell 204b of the first RAT 202a by performing Inter-Radio Access Technology (IRAT) measurements while waiting to receive a reconfiguration message from the primary cell 204a.

The UE 206 initiates the IRAT measurement with respect to the secondary cell 204b, while waiting to receive the reconfiguration message from the primary cell 204a. The UE 206 may start waiting to receive the reconfiguration message from the primary cell 204a, on registering with the primary cell 204a of the first RAT 202a after the completion/termination of the communication service initiated in the second RAT 202b.

The UE 206 initiates the IRAT measurement with respect to the secondary cell 204b for a defined or alternatively, given duration based on previous configurations stored in a database. The database may include at least one of, a NR frequency database, an LTE frequency database, and so on.

According to embodiments, the UE 206 initiates the IRAT measurement in response to registering with the primary cell 204a.

The UE 206 uses the previous configurations stored in the NR frequency database to initiate the IRAT measurement, if the primary cell 204a is the LTE BS supporting the ENDC and the secondary cell is the NR BS. In embodiments, the IRAT measurement performed using the NR frequency database may be referred hereinafter as a NR IRAT frequency measurement. The NR IRAT frequency measurement may be performed using at least one of, but is not limited to, a measurement gap configured for at least one of, another measurement object, a Connected Mode Discontinuous Reception (C-DRX) mode, a DR mode, another UE capable to measure without the gap (e.g., without the measurement gap), and so on. The UE 206 maintains and/or updates the NR frequency database based on at least one of, but is not limited to, a previously camped LTE frequency, a cell, corresponding NR frequency, a location, corresponding signal strength of the cell, and so on.

Alternatively, the UE 206 uses the previous configurations stored in the LTE frequency database to initiate the IRAT measurement, if the primary cell 204a is the NR BS supporting the NEDC and the secondary cell is the LTE BS. In embodiments, the IRAT measurement performed using the LTE frequency database may be referred hereinafter as an LTE IRAT frequency measurement. The LTE IRAT frequency measurement may be performed using at least one of, but is not limited to, the measurement gap configured for at least one of, another measurement object, the C-DRX mode, the DR mode, and another UE capable to measure without the gap, and so on. The UE 206 maintains and/or updates the LTE frequency database based on at least one of, but is not limited to, a previously camped NR frequency, a cell, corresponding NR frequency, a location, signal strength of the corresponding cell, and so on.

In an example, to perform IRAT measurement of the secondary cell 204b, the UE 206 identifies at least one of, another measurement object, the C-DRX mode, the DR mode, and another UE capable to measure without the gap, and so on, based on current configuration or capabilities of the UE 206. In another example, the UE 206 performs the IRAT measurement of the secondary cell 204b without any measurement gap configurated form the network. In another example, if the UE 206 does not able to perform the IRAT measurement of the secondary cell 204b without any measurement gap configured from the primary cell 204a, then the UE 206 uses the C-DRX mode of the DR mode, or the measurement gap sent for already configured another object.

In an example, the UE 206 maintains and/or updates the NR frequency database or the LTE frequency database for faster camping based on dataset created/learned over a period of time based on a configuration of the secondary cell 204b received from the primary cell 204a. Herein, the dataset refers to at least one of, the previously camped NR/LTE frequency, the cell, the corresponding NR/LTE frequency, the location, the signal strength of the corresponding cell, and so on.

The UE 206 defines the duration for the IRAT measurement based on factors such as, but are not limited to, time taken for registering with the primary cell 204a, a Radio Resource Control (RRC) state of peer stacks, a number of NR or LTE frequencies, a number of SIMs or RATs supported by the UE 206, Reference Signal Received Power (RSRP) of previously measured NR or LTE cell, an offset, and so on.

The initiated IRAT measurement with respect to the secondary cell 204*b* includes an LTE to NR measurement, if the primary cell is the LTE BS supporting the ENDC and the secondary cell is the NR BS. Alternatively, the initiated IRAT measurement with respect to the secondary cell 204*b* includes an NR to LTE measurement, if the primary cell is the NR BS supporting the NEDC, and the secondary cell is the LTE BS.

On initiating the IRAT measurement with respect to the secondary cell 204*b*, the UE 206 receives the reconfiguration message related to measurements of the secondary cell 204*b* (for example, an LTE measurement object, a NR measurement object, or the like) from the associated primary cell 204*a* within the defined or alternatively, given duration. The measurements of the secondary cell 204*b* corresponds to the IRAT measurement of the secondary cell 204*b*. Thus, the UE 206 initiates the IRAT measurement of the secondary cell 204*b* prior to receiving the reconfiguration message, which may enable the UE 206 for a faster addition of the secondary cell 204. In response to the received reconfiguration message from the primary cell 204*a*, the UE 206 sends an IRAT measurement report based on (e.g., a result of) the initiated IRAT measurement with respect to the secondary cell 204*b* to the primary cell 204*a*. The IRAT measurement report may include signal strength of the secondary cell 204*b* measured by the UE 206.

On sending the IRAT measurement report to the primary cell 204*a*, the UE 206 receives a configuration from the primary cell 204*a* to camp on the secondary cell 204*b* of the first RAT 202*a*. The configuration includes an NR cell configuration, if the primary cell is the LTE BS supporting the ENDO and the secondary cell is the NR BS. Alternatively, the configuration includes an LTE cell configuration, if the primary cell is the NR BS supporting the NEDC and the secondary cell is the LTE BS.

Thus, the UE 206 camps on the secondary cell 204*b* faster, as the UE 206 initiates the IRAT measurement while waiting to receive the reconfiguration message from the primary cell 204*a*. Initiating of the IRAT measurement while waiting to receive the reconfiguration message from the primary cell 204*a* avoids a delay in sending the IRAT measurement report from the UE 206 to the primary cell 204*a* due to Radio Frequency (RF) grant unavailability.

Embodiments herein enable the UE 206 to camp on the secondary cell 204*b* by reserving a RF grant for the configuration of the secondary cell 204*b*, while waiting to receive (e.g., before receiving) the reconfiguration message from the associated primary cell 204*a*.

The UE 206 reserves the RF grant for the defined or alternatively, given duration, on registering (e.g., in response to registering) with the primary cell 204*a* of the first RAT 202*a* after (e.g., by) completion/termination of at least one communication service initiated in the second RAT 202*b* or through the mobility from the second RAT 202*b*.

The UE 206 calculates the duration for reserving the RF grant as:

Duration $(T)=f$(time taken for registering with the primary cell)$+f$(RRC state of peer stacks)$+f_{non-linear}$(number of NR/LTE frequencies)$+f$(number of SIMs/RATs)$+f$(RSRP of previously measured NR or LTE cell)+offset wherein, 'f' represents a function, and the duration may be determined dynamically.

The UE 206 monitors the time taken for registering with primary cell for calculating the duration for reserving the RF grant (may be referred as RF grant reservation time), which anticipates the addition of the secondary cell 204*b*/SCG. If the time taken for registering with the primary cell 204*a* increases, then the UE 206 reduces the RF grant reservation time. If the time taken for registering with the primary cell 204*a* is less, then the UE 206 increases the RF grant reservation time.

The UE 206 monitors the RRC states of peer stacks to calculate the RF grant reservation time. If the RRC states of peer stack is in an idle state, then there may be minimal interruption for the RF grant, so that the UE 206 increases the RF grant reservation time. Otherwise, if the RRC states of peer stack is in a connected state, then there may be more interruption for the RF grant, so that the UE 206 decreases the RF grant reservation time accordingly.

The number of NR/LTE frequencies used for calculating the RF grant reservation time may be NR/LTE frequencies that have been stored in the respective database by the UE 206, when the ENDC/NEDC is configured from the primary cell 204*a* for the UE 206. Based on the stored number of NR/LTE frequencies that support the ENDC/NEDC, the UE 206 calculates/dynamically adjusts the RF grant reservation time, so that the peer stack may not be starved of the RF grant.

The UE 206 monitors the number of active SIMs or RATs for dynamically adjusting the RF grant reservation time are more, then the UE 206 reduces the RF grant reservation time, so that the peer stack may not be starved of the RF grant.

The UE 206 stores the previously measured RSRP of the NR/LTE cell in the respective database, whenever the ENDC/NEDC is configured from the primary cell 204*a* for the UE 206. If the RSRP of the previously measured NR/LTE is good, then the UE 206 increases the RF grant reservation time, thereby resulting in a probability of faster addition of the anticipated secondary cell 204*b* Otherwise, the UE 206 decreases the RF grant reservation time.

The UE 206 reserves the RF grant by retaining RF resources for at least one SIM that is expected to be configured with the secondary cell 204*b* and releasing the RF resources for other SIMs. According to embodiments, the UE 206 reserves the RF grant in response to registering with the primary cell 204*a*. The UE 206 may reserve the RF grant before, during or after performing the IRAT measurement.

The UE 206 receives the reconfiguration message from the primary cell 204*a*, on (e.g., after) reserving the RF grant. In response to the received reconfiguration message, the UE 206 sends a measurement report (e.g., the IRAT measurement report) with respect to the secondary cell 204*b* to the primary cell 204*a*. The measurement report includes the signal strength of the secondary cell 204*b* measured by the UE 206.

On sending the measurement report with respect to the secondary cell 204*b* to the primary cell 204*a*, the UE 206 receives the configuration from the primary cell 204*a* to camp on the secondary cell 204*b*. The configuration includes the NR cell configuration, if the primary cell is the LTE BS supporting the ENDC and the secondary cell is the NR BS. Alternatively, the configuration includes the LTE cell configuration, if the primary cell is the NR BS supporting the NEDC and the secondary cell is the LTE BS.

Thus, the UE 206 camps on the secondary cell 204*b* faster, by reserving the RF grant. Reserving the RF grant ensures that the UE 206 does not miss the reconfiguration message from the primary cell 204*a*, or reduces the occurrence of missing the reconfiguration message. Also, reserving the RF grant avoids the delay in sending the measurement report due to the RF grant unavailability. In addition, reserving the RF grant satisfies a user/UE desire to camp on the latest RAT and given Dual SIM Dual Standby (DSDS) limitation by compromising the duration for other stacks. According to embodiments, the term "latest RAT" may refer to a newest, most recently developed RAT (e.g., 3G is a newer RAT than 2G), and/or the RAT having a higher signal quality, higher bandwidth, lower congestion, etc. According to embodiments, the phrase "camping on the latest RAT" may refer to camping on a base station within the latest RAT.

Embodiments herein enable the UE 206 to camp on the secondary cell 204b, based on an indication received from the associated primary cell 204a about a follow-on Radio Resource Control (RRC) procedure.

The UE 206 receives the indication about the follow-on RRC procedure from the primary cell 204a, on registering with the primary cell 204a of the first RAT 202a after completion/termination of the at least one communication initiated in the second RAT 202b. In an example, the indication may include a Layer-2 indication (for example: a Media Access Control (MAC) control element). In another example, the indication may include a Layer-3 indication (for example: a new Information Element (IE) in a previous RRC message).

The UE 206 reserves the RF grant to camp on the secondary cell 204b, on (e.g., in response to) receiving the indication about the follow-on RRC procedure. Reserving the RF grant based on the indication about the follow-on RRC procedure ensures that the UE 206 does not miss any high priority configuration/message/subsequent message from the primary cell 204a or reduces the occurrence of the missed high priority configuration/message.

Embodiments herein enable the UE 206 to camp on the secondary cell 204b based on a duty cycle of each SIM.

The UE 206 allows each of the multiple SIMs based on the associated duty cycle for reserving the RF grant for the defined or alternatively, given duration, to camp on the secondary cell 204b. The UE 206 may determine the duty cycle for each of the SIMs based on a combination of parameters such as, but are not limited to, signaling vs signaling, packet switch (PS)/connected vs cell search. PS data vs signaling, and so on. Consider an example scenario, wherein the UE 206 performs a registration (for example, Tracking Area Update Request (TAU) request/Attach request) using a SIM1, and the UE 206 receives the reconfiguration message using a SIM 2. In such a scenario, the duty cycle determines how much duration of the RF grant may be allotted to each SIM.

FIG. 2 shows exemplary blocks of the wireless communication system 200, but it is to be understood that embodiments are not limited thereon. In embodiments, the wireless communication system 200 may include less or more blocks. Further, the labels or names of the blocks are used only for illustrative purpose and do not limit the scope of embodiments herein. One or more blocks may be combined together to perform same or substantially similar function in the wireless communication system 200.

Figure 3:
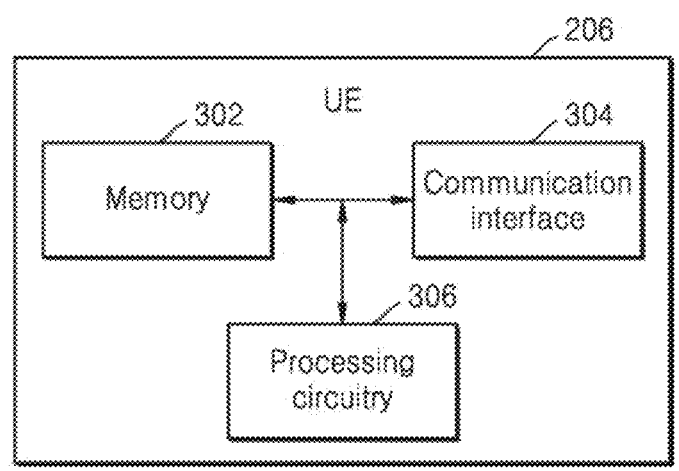
FIG. 3 is an example block diagram depicting various components of the UE for performing faster camping in the wireless communication system, according to embodiments as disclosed herein.

FIG. 3 is an example block diagram depicting various components of the UE 206 for performing the faster camping in the wireless communication system 200, according to embodiments as disclosed herein. The UE 206 includes a memory 302, a communication interface 304, and/or a processing circuitry 306. The UE 206 may also include a Radio Frequency (RF) transceiver, a signal processing circuitry, an Input/Output ports, a display, and so on (not shown).

The memory 302 stores at least one of, the duration for initiating the IRAT measurement and reserving the RF grant, the IRAT measurement report, the duty cycle, and so on. The memory 302 also stores a camping manager 400, which may be executed/processed by the processing circuitry 306 to enable the UE 206 to perform the faster camping in the wireless communication system 200. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include Random Access Memory (RAM), Read Only Memory (ROM), magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that may, over time, change (e.g., in Random Access Memory (RAM) or cache).

The communication interface 304 may be configured to enable the UE 206 to communicate with at least one BS 204 using an interface supported by the respective RAT (202a-202n). Examples of the interface may be, but are not limited to, a wired interface, a wireless interface, or any structure supporting communications over a wired or wireless connection.

The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. For example, the processing circuitry 306 may include at least one of, a single processer, a plurality of processors, multiple homogeneous or heterogeneous cores, multiple Central Processing Units (CPUs) of different kinds, microcontrollers, special media, and other accelerators.

The processing circuitry 306 may be configured to enable the UE 206 to camp on the secondary cell 204b of the first RAT 202a, on registering with the primary cell 204a after completion of the at least one communication service initiated (e.g., initiated, performed and completed) in the second RAT 202b. The processing circuitry 306 enables the UE 206 to camp on the secondary cell 204b by:

initiating the IRAT measurements while waiting to receive the reconfiguration message from the primary cell 204a of the first RAT 202a;

reserving the RF grant for the defined or alternatively, given duration, while waiting to receive the reconfiguration message from the primary cell 204a of the first RAT 202a;

receiving the indication about the follow-on RRC procedure from the primary cell 204a; or allowing each of the multiple SIMs of the UE 206 based on the associated duty cycle to reserve the RF grant for the defined or alternatively, given duration.

Figure 4:
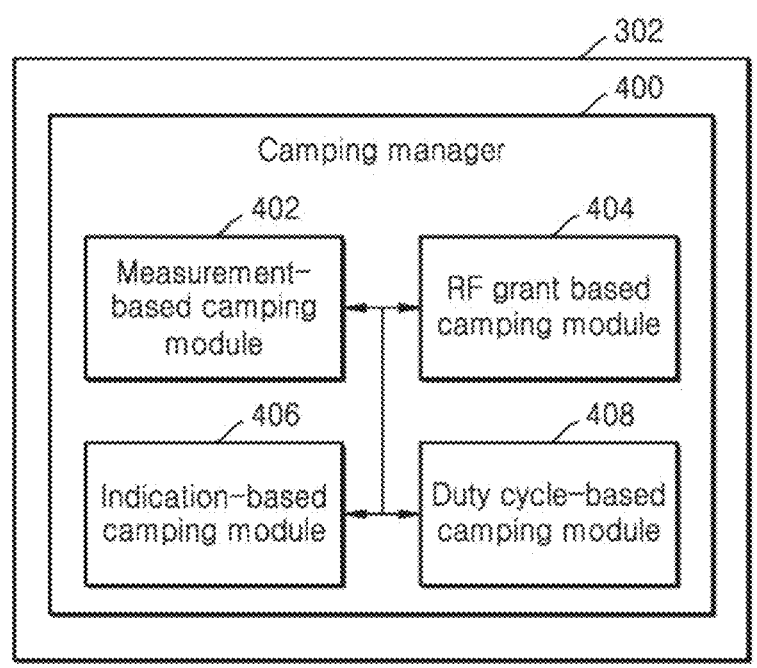
FIG. 4 depicts a camping manager performable in the UE for managing the camping of the UE in the wireless communication system, according to embodiments as disclosed herein.

The processing circuitry 306 executes the camping manager 400 to manage the camping of the UE 206 on the secondary cell 204b. As depicted in FIG. 4, the camping manager 400 includes a measurement-based camping module 402, a RF grant based camping module 404, an indication-based camping module 406, and/or a duty cycle-based camping module 408.

The measurement-based camping module 402 may be configured to enable the UE 206 to camp on the secondary cell 204b by performing the IRAT measurement, while waiting to receive the reconfiguration message from the associated primary cell 204a. The measurement-based camping module 402 initiates the IRAT measurement with respect to the secondary cell 204b, on registering with the primary cell 204a of the first RAT 202a after completion of the at least one communication service initiated in the second RAT 202b. The measurement-based camping module 402 initiates the IRAT measurement for the defined or alternatively, given duration based on the previous configurations stored in the database. The database includes at least one of, the NR frequency database, the LTE frequency database, and so on. The initiated IRAT measurement includes at least one of, the LTE to NR measurement, the NR to LTE measurement, and so on. The measurement-based camping module 402 receives the reconfiguration message from the primary cell 204a, on initiating the IRAT measurement for the secondary cell 204b. In response to the received reconfiguration message, the measurement-based camping module 402 sends the IRAT measurement report to the primary cell 204a and receives the configuration of the secondary cell 204b from the primary cell 204a. The measurement-based camping module 402 enables the UE 206 to camp on the secondary cell based on the received configuration from the primary cell 204a. The configuration includes at least one of, the NR cell configuration, the LTE cell configuration, and so on.

The RF grant based camping module 404 may be configured to enable the UE 206 to camp on the secondary cell 204b by reserving the RF grant for the configuration of the secondary cell 204b. The RF grant based camping module 404 reserves the RF grant for the defined or alternatively, given duration, on registering with the primary cell of the first RAT 202a after completion of the at least one communication service initiated in the second RAT 202b. The RF grant based camping module 404 reserves the RF grant by retaining the RF resources for the at least one SIM of the UE that is expected to be configured with the secondary cell 204b and releasing the RF resources for other SIMs of the UE 206. The RF grant based camping module 404 receives the reconfiguration message from the primary cell 204a and sends the measurement report of the secondary cell 204b to the primary cell 204a based on the received reconfiguration message. In response to the sent measurement report of the secondary cell 204b, the RF grant based camping module 404 receives the configuration from the primary cell 204a for enabling the UE 206 to camp on the secondary cell 204b.

The indication-based camping module 406 may be configured to enable the UE 206 to obtain the configuration of the secondary cell 204b based on the indication about the follow-on RRC procedure received from the primary cell 204a. The indication-based camping module 406 receives the indication from the primary cell 204a about the follow-on RRC procedure, on registering with the primary cell 204a of the first RAT 202a after the completion of the at least one communication service initiated in the second RAT 202b. The indication-based camping module 406 reserves the RF grant for the configuration of the secondary cell 204b, on receiving the indication about the follow-on RRC procedure.

The duty cycle-based camping module 408 may be configured to enable the UE 206 to obtain the configuration of the secondary cell 204b based on the duty cycle of each SIM of the UE 206. The duty cycle-based camping module 408 allows each of the multiple SIMs of the UE 206 based on the associated duty cycle to reserve the RF grant for the defined or alternatively, given duration for receiving the configuration of the secondary cell 204b from the primary cell 204a.

FIGS. 3 and 4 show exemplary blocks of the UE 206, but it is to be understood that embodiments are not limited thereon. In embodiments, the UE 206 may include less or more blocks. Further, the labels or names of the blocks are used only for illustrative purpose and do not limit the scope of embodiments herein. One or more blocks may be combined together to perform same or substantially similar function in the UE 206.

Figure 5:
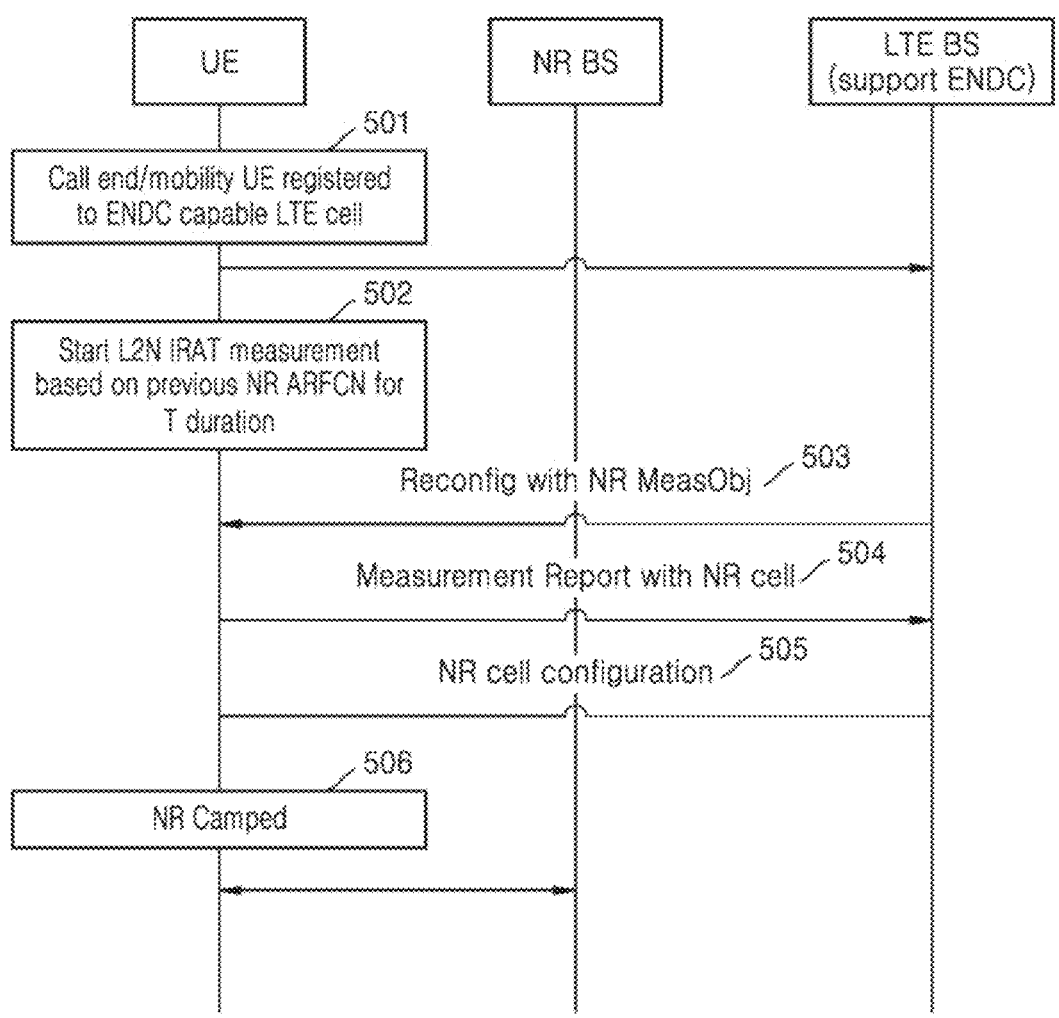
FIG. 5 is an example sequence diagram depicting faster camping of the UE by performing an Inter-RAT (IRAT) measurement while waiting to receive a reconfiguration message from a primary cell, according to embodiments as disclosed herein.

FIG. 5 is an example sequence diagram depicting the faster camping of the UE 206 by performing the IRAT measurement while waiting to receive the reconfiguration message from the primary cell 204a, according to embodiments as disclosed herein.

The camping of the UE 206 is discussed herein by considering the first RAT 202a as the LTE supporting the ENDC, but any other RAT may be considered. first RAT 202a includes the primary cell 204a as the LTE cell/BS supporting the ENDC and the secondary cell 204b as the NR cell/BS.

At operation 501, the UE 206 registers with the LTE BS supporting the ENDC (the primary cell 204a), on terminating the at least one communication service (for example: a voice call) initiated in the second RAT 202b.

At operation 502, the UE 206 initiates the IRAT measurement of the NR BS (the secondary cell 204b) associated with the LTE BS supporting the ENDC. The UE 206 initiates the IRAT measurement of the NR BS based on the previous configurations stored in the NR frequency database (e.g., a previous NR Absolute Radio-Frequency Channel Number (ARFCN). The IRAT measurement includes the LTE to NR (L2N) IRAT measurement.

At operation 503, the LTE BS supporting the ENDC sends the reconfiguration message with a NR measurement object to the UE 206. At operation 504, the UE 206 sends the IRAT measurement report of the NR BS to the LTE BS supporting the ENDC. At operation 505, the LTE BS supporting the ENDC sends the NR cell configuration to the UE 206. At operation 506, the UE 206 camps on the NR BS based on the received NR cell configuration. Thus, resulting in the faster camping of the UE 206 on the latest RAT. According to embodiments, once camped on the secondary cell 204b (e.g., the NR BS), the UE 206 generates a communication signal, and transmits the communication signal to the secondary cell 204b to perform communication with the secondary cell 204b (and/or another device via the secondary cell 204b). According to embodiments, once camped on the secondary cell 204b (e.g., the NR BS), the UE 206 receives a communication signal from the secondary cell 204b, and demodulates the communication signal to perform communication with the secondary cell 204b (and/or another device via the secondary cell 204b).

Figure 6:
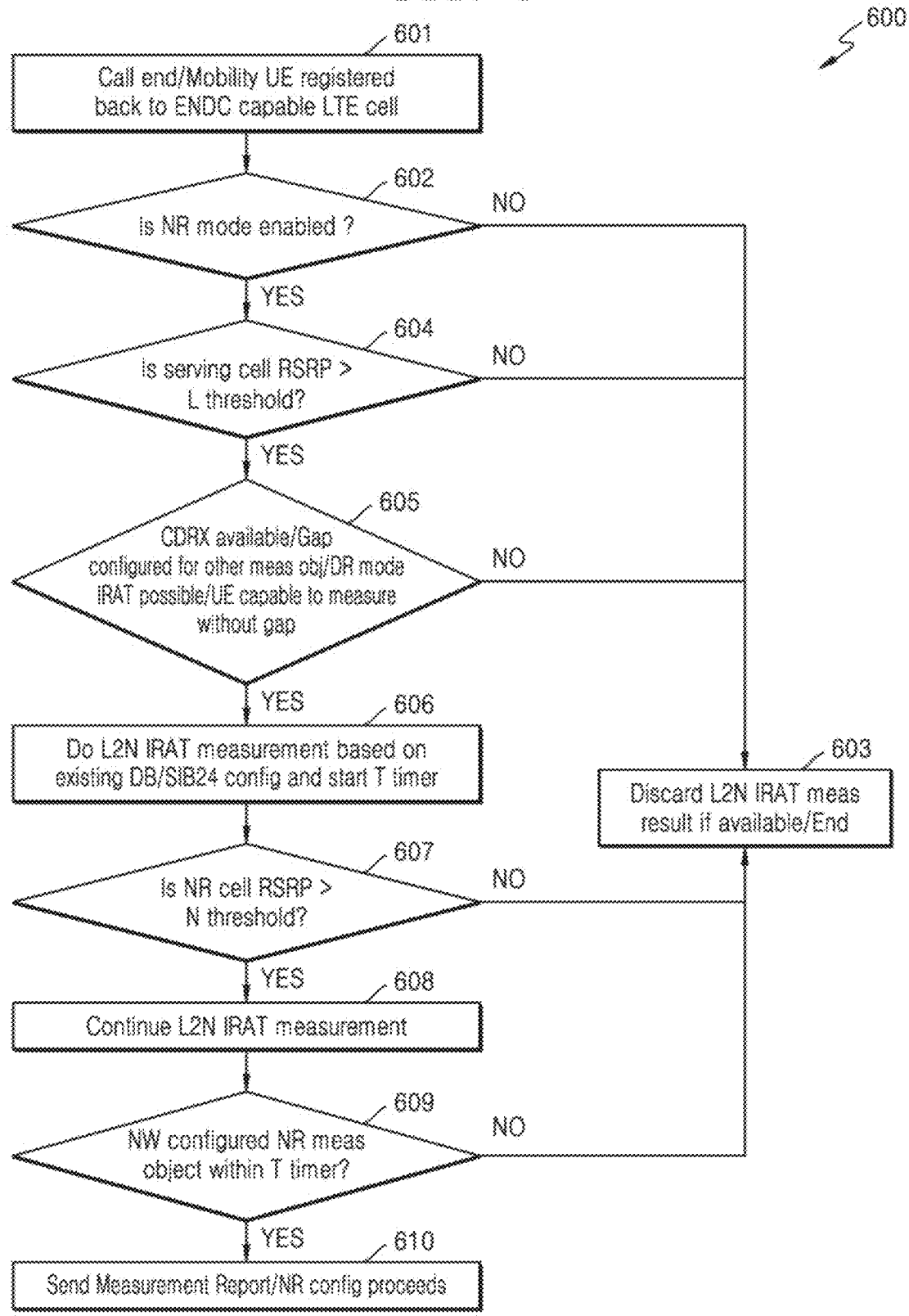
FIG. 6 is an example flow diagram depicting a method for performing faster camping in the wireless communication system by performing the IRAT measurement while waiting to receive the reconfiguration message from the primary cell, according to embodiments as disclosed herein.

FIG. 6 is an example flow diagram 600 depicting a method for performing the faster camping in the wireless communication system 200 by performing the IRAT measurement while waiting to receive the reconfiguration message from the primary cell 204a, according to embodiments as disclosed herein.

The camping of the UE 206 is discussed herein by considering the first RAT 202a as the LTE supporting the ENDC, but any other RAT may be considered. The first RAT 202a includes the primary cell 204a as the LTE cell/BS supporting the ENDC and the secondary cell 204b as the NR cell/BS.

At operation 601, the UE 206 registers with the LTE BS supporting the ENDC of the first RAT 202a, on terminating the at least one communication service initiated in the second RAT 202b.

At operation 602, the UE 206 checks if a NR mode is enabled. Checking if the NR mode is enabled refers to checking whether the NR RAT support is enabled or not. If the NR mode is not enabled, at operation 603, the UE 206 discards a process of performing the IRAT measurement.

At operation 604, the UE 206 checks if the RSRP of the serving cell/LTE BS supporting the ENDC is greater than a L threshold, where the L threshold is criteria of signal condition pertaining to the LTE cell configurable by a network/primary cell 204a or implementation specific parameter within UE. If the RSRP of the LTE BS supporting the ENDC is not greater than the L threshold, the UE 206 performs the operation 603.

If the RSRP of the LTE BS supporting the ENDC is greater than the L threshold, at operation 605, the UE 206 uses the previous configurations stored in the NR frequency database to initiate the IRAT measurement. For example, the UE 206 checks if the Connected Mode Discontinuous Reception (CDRX) is available, if the gap is configured for the other measurement object, if the Dual Registration (DR) mode IRAT is possible or if the UE 206 is capable to measure the IRAT measurement without the gap.

If the CDRX is not available, the gap is not configured for the other measurement object, the DR mode IRAT is not possible or the UE 206 is not capable to measure the IRAT measurement without the gap, the UE 206 performs the operation 603. Otherwise, at operation 606, the UE 206 initiates the IRAT measurement with respect to the NR BS based on the existing NR frequency database/SIB24 configured in the current cell, by starting a timer T (with the defined duration). The initiated IRAT measurement includes the LTE to NR (L2N) IRAT measurement.

On initiating the IRAT measurement, at operation 607, the UE 206 checks if the RSRP of the NR BS is greater than a N threshold, where the N threshold is criteria of signal condition pertaining to NR cell configurable by the network or implementation specific parameter within the UE 206. If the RSRP of the NR BS is not greater than the N threshold, the UE 206 performs the operation 603.

If the RSRP of the NR BS is greater than the N threshold, at operation 608, the UE 206 continues the IRAT measurement. At operation 609, the UE 206 checks if the UE 206 has received the reconfiguration message with the NR measurement object from the LTE BS supporting the ENDO within the expiry of the timer T (e.g., the defined or alternatively, given duration). If the UE 206 has not received the reconfiguration message from the LTE BS supporting the ENDO within the expiry of the timer T, the UE 206 performs the operation 603.

If the UE 206 has received the reconfiguration message from the LTE BS supporting the ENDO within the expiry of the timer T, at operation 610, the UE 206 sends the measurement report of the NR BS based on the initiated IRAT measurement report to the LTE BS supporting the ENDO and receives the configuration of the NR BS from the LTE BS supporting the ENDO. The UE 206 camps on the NR BS based on the received configuration from the LTE BS supporting the ENDO. The various operations in method 600 may be performed in the order presented, in a different order, simultaneously or contemporaneously. Further, in embodiments, some operations listed in FIG. 6 may be omitted.

Figure 7:
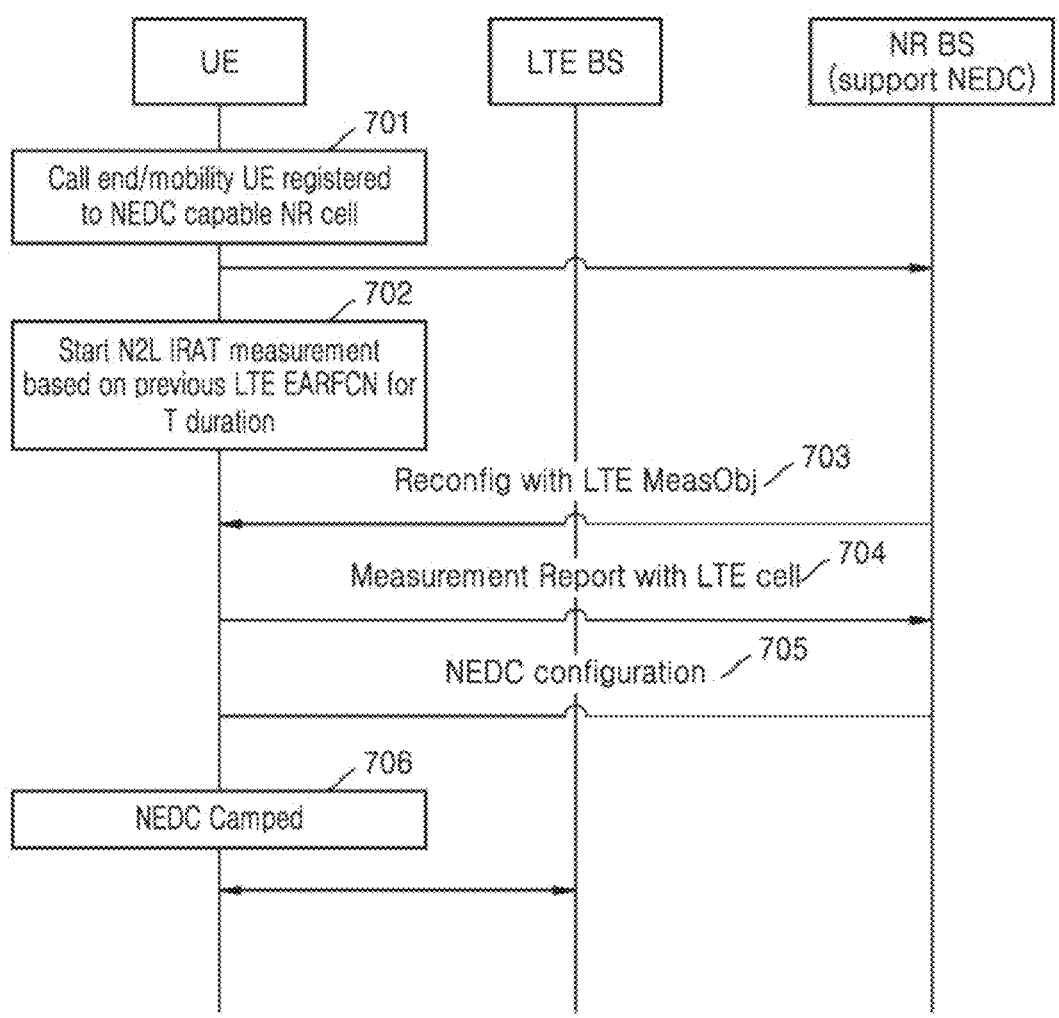
FIG. 7 is another example sequence diagram depicting faster camping of the UE by performing the IRAT measurement while waiting to receive the reconfiguration message from the primary cell, according to embodiments as disclosed herein.

FIG. 7 is another example sequence diagram depicting the faster camping of the UE 206 by performing the IRAT measurement while waiting to receive the reconfiguration message from the primary cell 204a, according to embodiments as disclosed herein.

The camping of the UE 206 is discussed herein by considering the first RAT 202a as the NR supporting the NEDC, but any other RAT may be considered. The first RAT 202a includes the primary cell 204a as the NR cell/BS supporting the NEDC and the secondary cell 204b as the LTE cell/BS.

At operation 701, the UE 206 registers with the NR BS supporting the NEDC (the primary cell 204a), on terminating the at least one communication service (for example: a voice call) initiated in the second RAT 202b.

At operation 702, the UE 206 initiates the IRAT measurement of the LTE BS (the secondary cell 204b) associated with the NR BS supporting the NEDC. The UE 206 initiates the IRAT measurement of the LTE BS based on the previous configurations stored in the LTE frequency database (e.g., a previous LTE E-UTRA Absolute Radio-Frequency Channel Number (EARFCN). The IRAT measurement includes the NR to LTE (N2L) IRAT measurement.

At operation 703, the NR BS supporting the NEDC sends the reconfiguration message with an LTE measurement object to the UE 206. At operation 704, the UE 206 sends the IRAT measurement report of the LTE BS to the NR BS supporting the NEDC. At operation 705, the NR BS supporting the NEDC sends the LTE cell/NEDC configuration to the UE 206. At operation 706, the UE 206 camps on the LTE BS based on the received LTE cell configuration. Thus, resulting in the faster camping of the UE 206 on the latest RAT.

Figure 8:
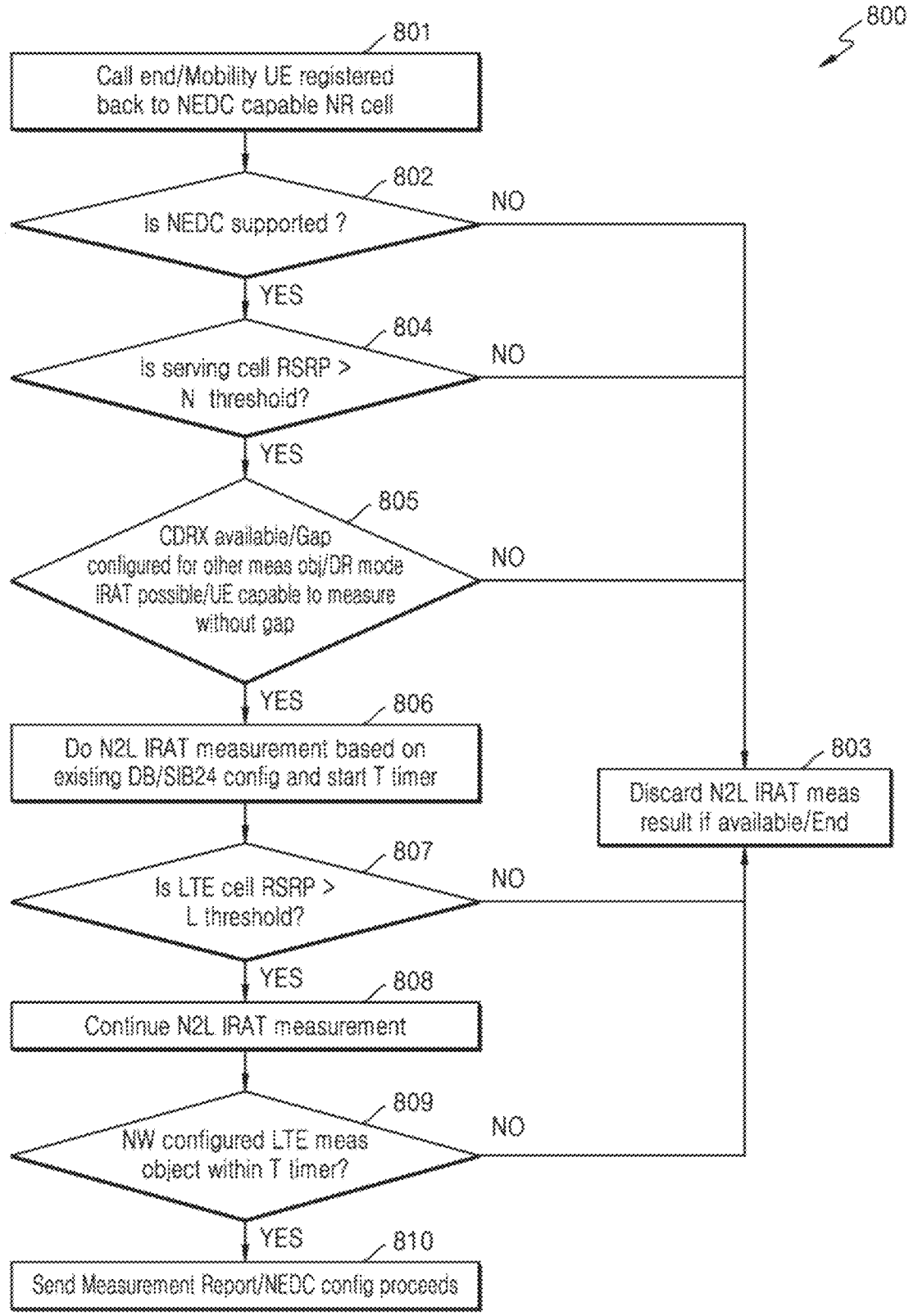
FIG. 8 is another example flow diagram depicting a method for performing faster camping in the wireless communication system by performing the IRAT measurement while waiting to receive the reconfiguration message from the primary cell, according to embodiments as disclosed herein.

FIG. 8 is another example flow diagram 800 depicting a method for performing the faster camping in the wireless communication system 200 by performing the IRAT measurement while waiting to receive the reconfiguration message from the primary cell 204a, according to embodiments as disclosed herein.

The camping of the UE 206 is discussed herein by considering the first RAT 202a as the NR supporting the NEDC, but any other RAT may be considered. The first RAT 202a includes the primary cell 204a as the NR cell/BS supporting the NEDC and the secondary cell 204b as the LTE cell/BS.

At operation 801, the UE 206 registers with the NR BS supporting the NEDC of the first RAT 202a, on terminating the at least one communication service initiated in the second RAT 202b.

At operation 802, the UE 206 checks if a NEDC mode is enabled. If the NEDC mode is not enabled, at operation 803, the UE 206 discards a process of performing the IRAT measurement.

If the NEDC mode is enabled, at operation 804, the UE 206 checks if the RSRP of the serving cell/NR BS supporting the NEDC is greater than the N threshold. If the RSRP of the NR BS supporting the NEDC is not greater than the N threshold, the UE 206 performs the operation 803.

If the RSRP of the NR BS supporting the NEDC is greater than the N threshold, at operation 805, the UE 206 uses the previous configurations stored in the LTE frequency database to initiate the IRAT measurement. For example, the UE 206 checks if the CDRX is available, the gap configured for the other measurement object, the DR mode IRAT possible or the UE 206 is capable to measure the IRAT measurement without the gap.

If the CDRX is not available, the gap is not configured for the other measurement object, the DR mode IRAT is not possible or the UE 206 is not capable to measure the IRAT measurement without the gap, the UE 206 performs the operation 803. Otherwise, at operation 806, the UE 206 initiates the IRAT measurement with respect to the LTE BS based on the existing configurations of the LTE frequency database, by starting the timer T. The initiated IRAT measurement includes the NR to LTE (N2L) IRAT measurement.

On initiating the IRAT measurement, at operation 807, the UE 206 checks if the RSRP of the LTE BS is greater than the L threshold. If the RSRP of the LTE BS is not greater than the L threshold, the UE 206 performs the operation 803.

If the RSRP of the LTE BS is greater than the L threshold, at operation 808, the UE 206 continues the IRAT measurement. At operation 809, the UE 206 checks if the UE 206 has received the reconfiguration message with the LTE measurement object from the NR BS supporting the NEDC within the expiry of the timer T. If the UE 206 has not received the reconfiguration message from the NR BS supporting the NEDC within the expiry of the timer T, the UE 206 performs the operation 803.

If the UE 206 has received the reconfiguration message from the NR BS supporting the NEDC within the expiry of the timer T, at operation 810, the UE 206 sends the measurement report of the LTE BS based on the initiated IRAT measurement report to the NR BS supporting the NEDC and receives the configuration of the LTE BS from the NR BS supporting the NEDC. The UE 206 camps on the LTE BS based on the received configuration from the NR BS supporting the NEDC. The various operations in method 800 may be performed in the order presented, in a different order, simultaneously or contemporaneously. Further, in embodiments, some operations listed in FIG. 8 may be omitted.

Figure 9:
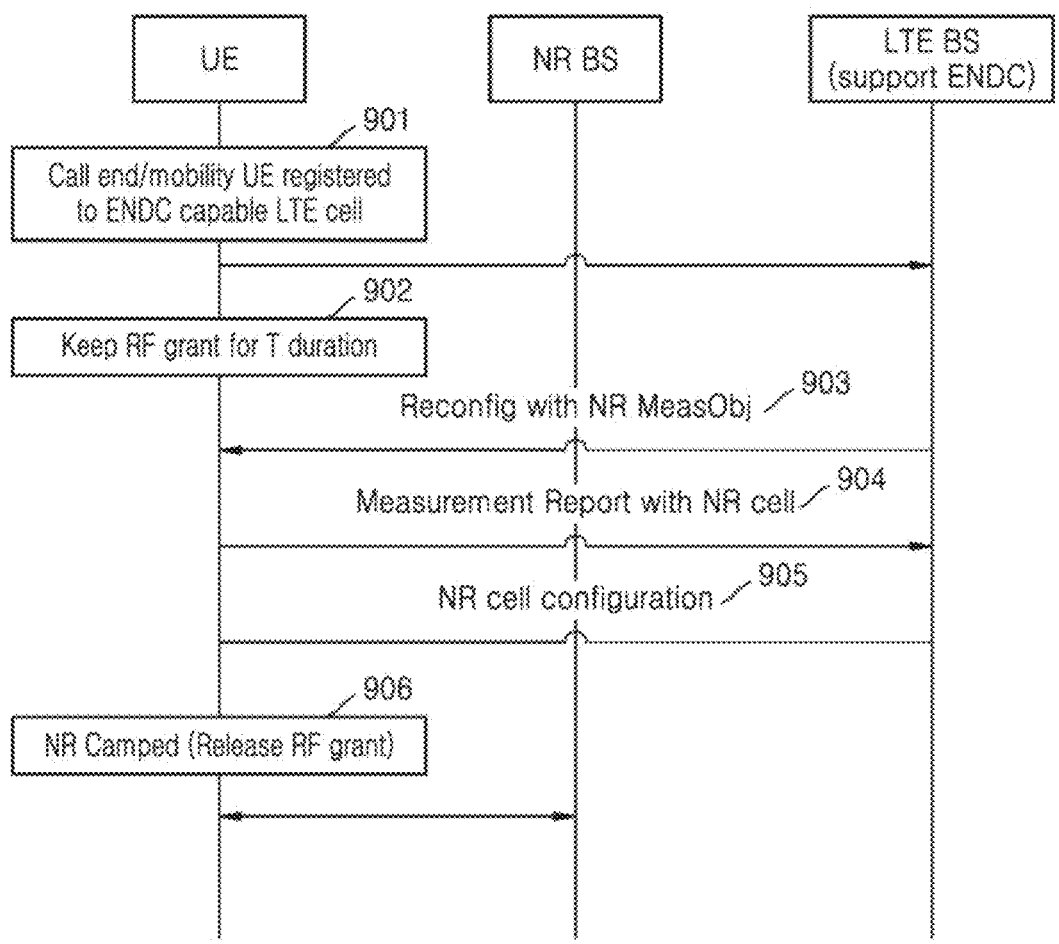
FIG. 9 is an example sequence diagram depicting faster camping of the UE by reserving a Radio Frequency (RF) grant, according to embodiments as disclosed herein.

FIG. 9 is an example sequence diagram depicting the faster camping of the UE 206 by reserving the RF grant, according to embodiments as disclosed herein.

The camping of the UE 206 is discussed herein by considering the first RAT 202a as the LTE supporting the ENDO, but any other RAT may be considered.

The first RAT 202a includes the primary cell 204a as the LTE cell/BS supporting the ENDO and the secondary cell 204b as the NR cell/BS.

At operation 901, the UE 206 registers with the LTE BS supporting the ENDO (the primary cell 204a), on terminating the at least one communication service (for example: a voice call) initiated in the second RAT 202b.

At operation 902, the UE 206 reserves the RF grant for the defined or alternatively, given duration (T). The UE 206 reserves the RF grant by retaining RF resources for the at least one SIM that is expected to be configured with the secondary cell 204b and releasing the RF resources for other SIMs.

At operation 903, the LTE BS supporting the ENDO sends the reconfiguration message with the NR measurement object to the UE 206. At operation 904, the UE 206 sends the measurement report of the NR BS to the LTE BS supporting the ENDO. At operation 905, the LTE BS supporting the ENDO sends the NR cell configuration to the UE 206. At operation 906, the UE 206 camps on the NR BS based on the received NR cell configuration. Thus, resulting in the faster camping of the UE 206 on the latest RAT.

Figure 10:
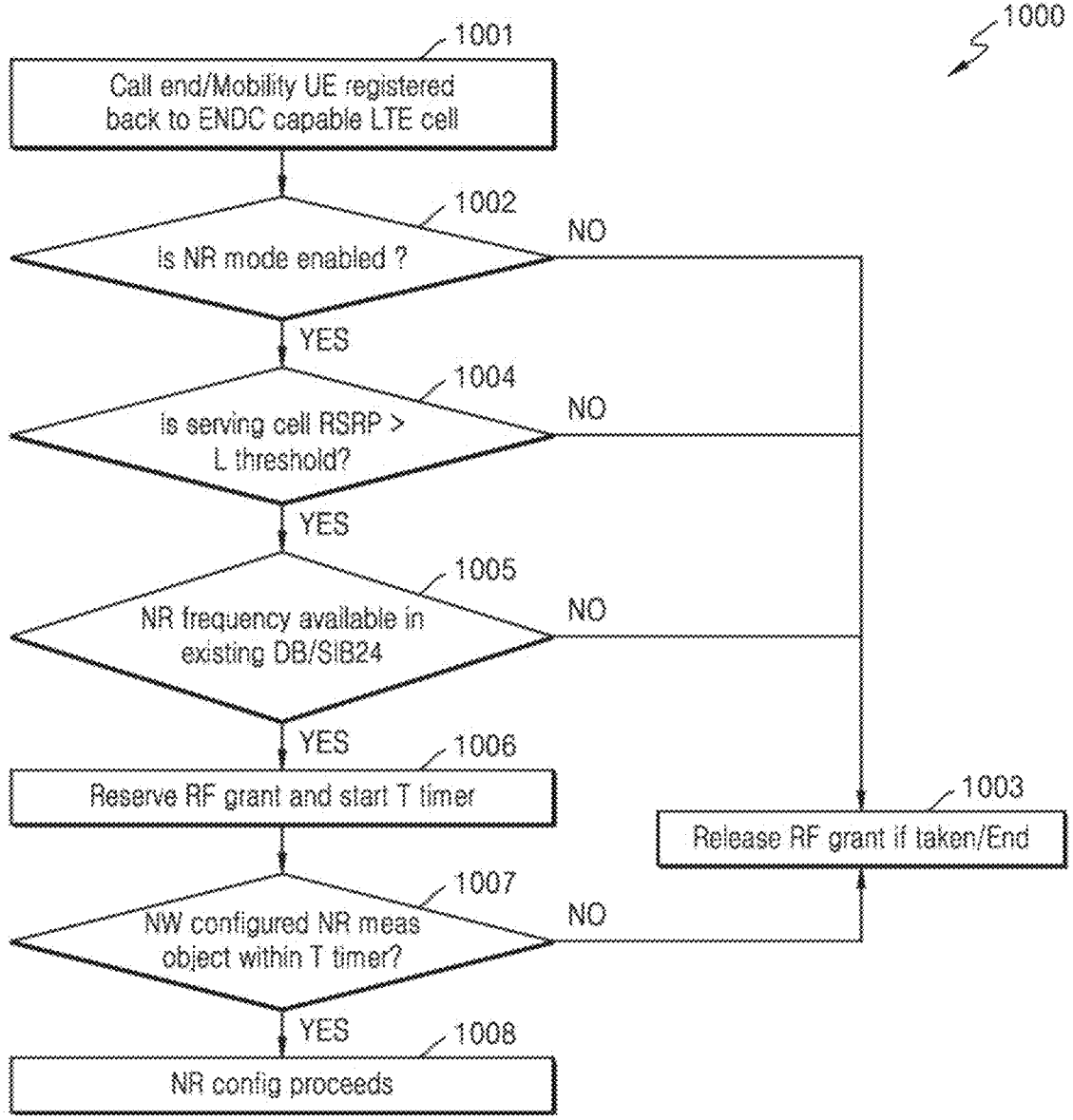
FIG. 10 is an example flow diagram depicting a method for performing faster camping in the wireless communication system by reserving the RF grant, according to embodiments as disclosed herein.

FIG. 10 is an example flow diagram 1000 depicting a method for performing the faster camping in the wireless communication system 200 by reserving the RF grant, according to embodiments as disclosed herein.

The camping of the UE 206 is discussed herein by considering the first RAT 202a as the LTE supporting the ENDO, but any other RAT may be considered. The first RAT 202a includes the primary cell 204a as the LTE cell/BS supporting the ENDO and the secondary cell 204b as the NR cell/BS.

At operation 1001, the UE 206 registers with the LTE BS supporting the ENDO of the first RAT 202a, on terminating the at least one communication service initiated in the second RAT 202b.

At operation 1002, the UE 206 checks if the NR mode is enabled. If the NR mode is not enabled, at operation 1003, the UE 206 releases the RF grant if the RF grant has already been reserved.

If the NR mode is enabled, at operation 1004, the UE 206 checks if the RSRP of the serving cell/LTE BS supporting the ENDO is greater than the L threshold. If the RSRP of the LTE BS supporting the ENDO is not greater than the L threshold, the UE 206 performs the operation 1003.

If the RSRP of the LTE BS supporting the ENDO is greater than the L threshold, at operation 1005, the UE 206 checks if the NR frequency is available in the previous configurations of the NR frequency database/SIB24. If the NR frequency is not available in the previous configurations of the NR frequency database/SIB24, the UE 206 performs the operation 1003.

If the NR frequency is available in the previous configurations of the NR frequency database/SIB24, at operation 1006, the UE 206 reserves the RF grant and initiates the timer T (with the defined or alternatively, given duration).

At operation 1007, the UE 206 checks if the UE 206 has received the reconfiguration message with the NR measurement object from the LTE BS supporting the ENDO within the expiry of the timer T. If the UE 206 has not received the reconfiguration message from the LTE BS supporting the ENDO within the expiry of the timer T, the UE 206 performs the operation 1003.

If the UE 206 has received the reconfiguration message from the LTE BS supporting the ENDO within the expiry of the timer T, at operation 1008, the UE 206 sends the measurement report of the NR BS to the LTE BS supporting the ENDO and receives the configuration of the NR BS from the LTE BS supporting the ENDC. The UE 206 camps on the NR BS based on the received configuration from the LTE BS supporting the ENDC. The various operations in method 1000 may be performed in the order presented, in a different order, simultaneously or contemporaneously. Further, in embodiments, some operations listed in FIG. 10 may be omitted.

Figure 11:
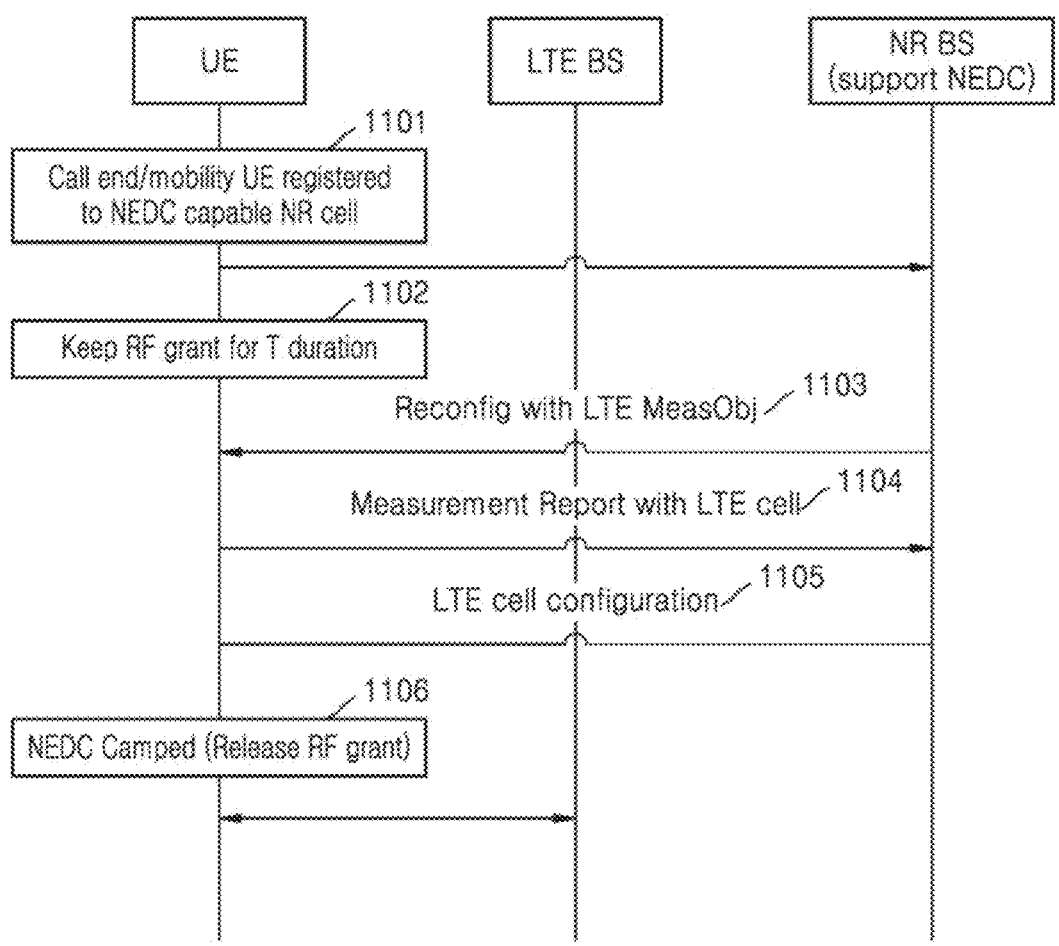
FIG. 11 is another example sequence diagram depicting faster camping of the UE by reserving the RF grant, according to embodiments as disclosed herein.

FIG. 11 is another example sequence diagram depicting the faster camping of the UE 206 by reserving the RF grant, according to embodiments as disclosed herein.

The camping of the UE 206 is discussed herein by considering the first RAT 202a as the NR supporting the NEDC, but any other RAT may be considered. The first RAT 202a includes the primary cell 204a as the NR cell/BS supporting the NEDC and the secondary cell 204b as the LTE cell/BS.

At operation 1101, the UE 206 registers with the NR BS supporting the NEDC (the primary cell 204a), on terminating the at least one communication service (for example: a voice call) initiated in the second RAT 202b.

At operation 1102, the UE 206 reserves the RF grant for the defined or alternatively, given duration. The UE 206 reserves the RF grant by retaining RF resources for at least one SIM that is expected to be configured with the secondary cell 204b and releasing the RF resources for other SIMs.

At operation 1103, the NR BS supporting the NEDC sends the reconfiguration message with the LTE measurement object to the UE 206. At operation 1104, the UE 206 sends the measurement report of the LTE BS to the NR BS supporting the NEDC. At operation 1105, the NR BS supporting the NEDC sends the LTE cell/NEDC configuration to the UE 206. At operation 1106, the UE 206 camps on the LTE BS based on the received LTE cell configuration. Thus, resulting in the faster camping of the UE 206 on the latest RAT.

Figure 12:
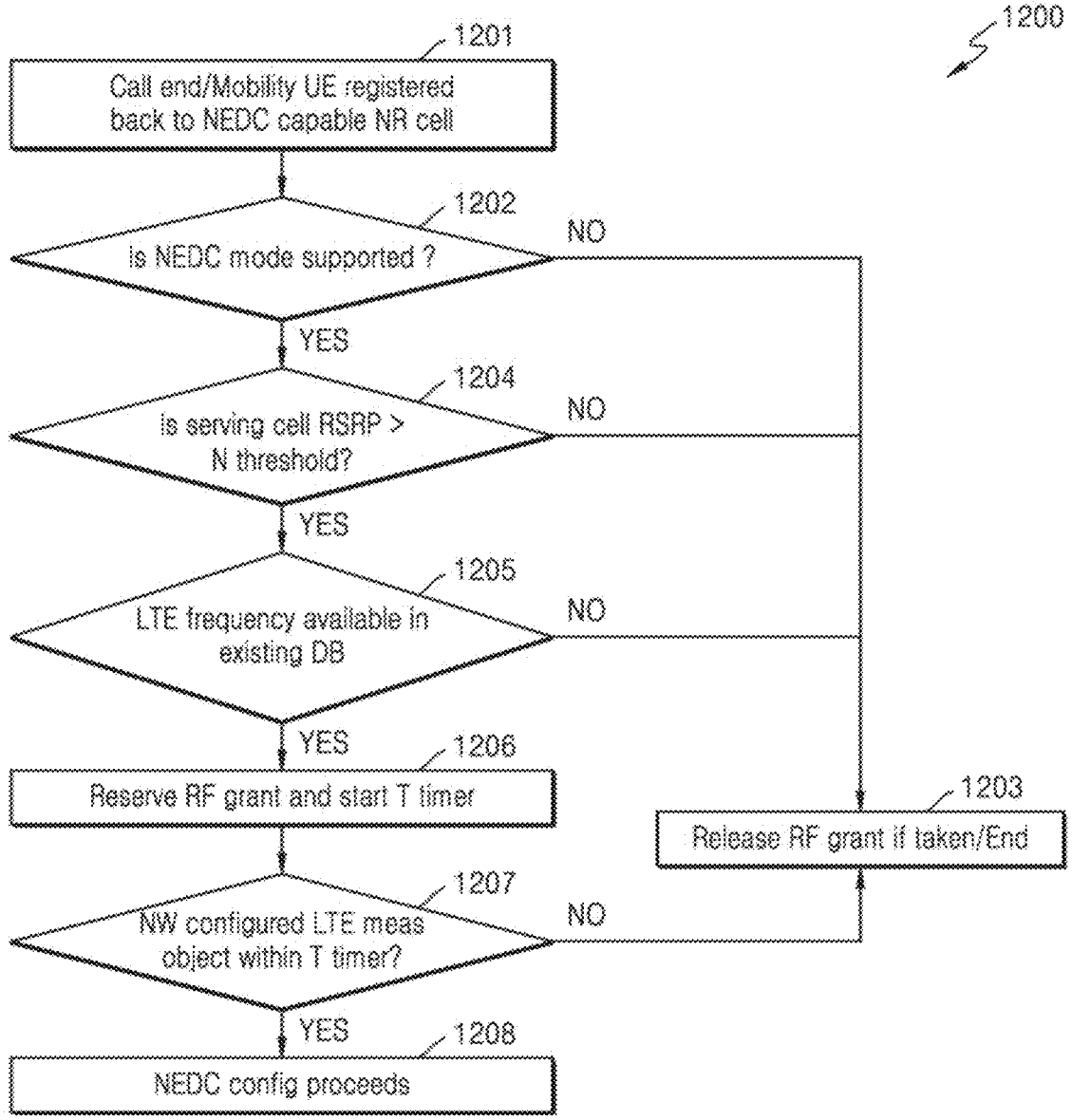
FIG. 12 is another example flow diagram depicting a method for performing faster camping in the wireless communication system by reserving the RF grant, according to embodiments as disclosed herein.

FIG. 12 is another example flow diagram 1200 depicting a method for performing the faster camping in the wireless communication system 200 by reserving the RF grant, according to embodiments as disclosed herein.

The camping of the UE 206 is discussed herein by considering the first RAT 202a as the NR supporting the NEDC, but any other RAT may be considered. The first RAT 202a includes the primary cell 204a as the NR cell/BS supporting the NEDC and the secondary cell 204b as the LTE cell/BS.

At operation 1201, the UE 206 registers with the NR BS supporting the NEDC of the first RAT 202a, on terminating the at least one communication service initiated in the second RAT 202b.

At operation 1202, the UE 206 checks if the NEDC mode is enabled. If the NEDC mode is not enabled, at operation 1203, the UE 206 releases the RF grant if the RF grant has already been reserved.

If the NEDC mode is enabled, at operation 1204, the UE 206 checks if the RSRP of the serving cell/NR BS supporting the NEDC is greater than the N threshold. If the RSRP of the NR BS supporting the NEDC is not greater than the N threshold, the UE 206 performs the operation 1203.

If the RSRP of the NR BS supporting the NEDC is greater than the N threshold, at operation 1205, the UE 206 checks if the LTE frequency is available in the previous configurations stored in the LTE frequency database. If the LTE frequency is not available in the previous configurations of the LTE frequency database, the UE 206 performs the operation 1203.

If the NR frequency is available in the previous configurations of the NR frequency database/SIB24, at operation 1206, the UE 206 reserves the RF grant and initiates the timer T (with the defined or alternatively, given duration).

At operation 1207, the UE 206 checks if the UE 206 has received the reconfiguration message with the LTE measurement object from the NR BS supporting the NEDC within the expiry of the timer T. If the UE 206 has not received the reconfiguration message from the NR BS supporting the NEDC within the expiry of the timer T, the UE 206 performs the operation 1203.

If the UE 206 has received the reconfiguration message from the NR BS supporting the NEDC within the expiry of the timer T, at operation 1208, the UE 206 sends the measurement report of the LTE BS based on the initiated IRAT measurement report to the NR BS supporting the NEDC and receives the configuration of the LTE BS (the NEDC configuration) from the NR BS supporting the NEDC. The UE 206 camps on the LTE BS based on the received configuration from the NR BS supporting the NEDC. The various operations in method 1200 may be performed in the order presented, in a different order, simultaneously or contemporaneously. Further, in embodiments, some operations listed in FIG. 12 may be omitted.

Figure 13:
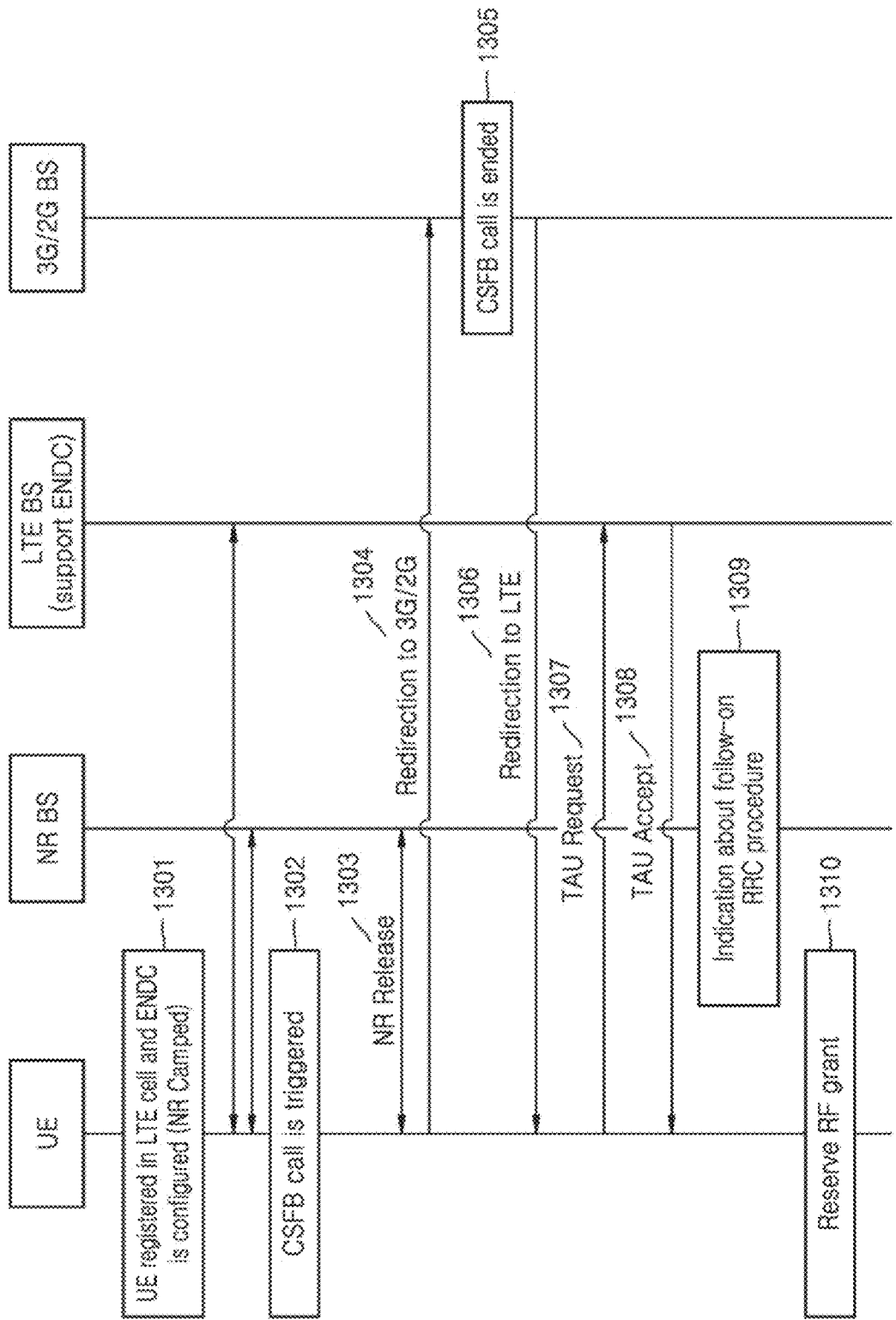
FIG. 13 is an example sequence diagram depicting reception of an indication about a follow-on Radio Resource Control (RRC) procedure to reserve the RF grant, according to embodiments as disclosed herein.

FIG. 13 is an example sequence diagram depicting reception of the indication about the follow-on RRC procedure to reserve the RF grant, according to embodiments as disclosed herein.

At operations 1301 and 1302, the UE 206 initially camps on the first RAT/LTE supporting the ENDC configuration. The first RAT includes the primary cell 204a as the LTE BS supporting the ENDC and the secondary cell 204b supporting the NR BS. Thereby, the UE 206 obtains the configuration of the NR BS (the secondary cell 204b). On camping onto the first RAT, a Circuit Switched Fallback (CSFB) call may be triggered/initiated in the second RAT 202b (for example: 3G/2G network) for the UE 206.

At operation 1303, the NR BS releases the NR configuration for the UE 206 due to the initiated CSFB call. At operation 1304, the UE 206 is redirected to the 3G/2G network. At operations 1305 and 1306, after the CSFB call ended, the UE 206 reverts to the LTE BS supporting the ENDC similar to the operation 1301. At operation 1307, the UE 206 sends a Tracking Area Update (TAU) request to the LTE BS supporting the ENDC.

At operation 1308, the LTE BS supporting the ENDC sends the TAU accept to the UE 206. In embodiments, at operation 1309, the LTE BS supporting the ENDC sends the indication about the follow-on RRC procedure to the UE 206.

At operation 1310, the UE 206 reserves the RF grant for the configuration of the NR BS based on the received indication about the follow-on RRC procedure. Thus, the UE 206 does not miss any reconfiguration message with the NR measurement object from the LTE BS supporting the ENDC.

Figure 14:
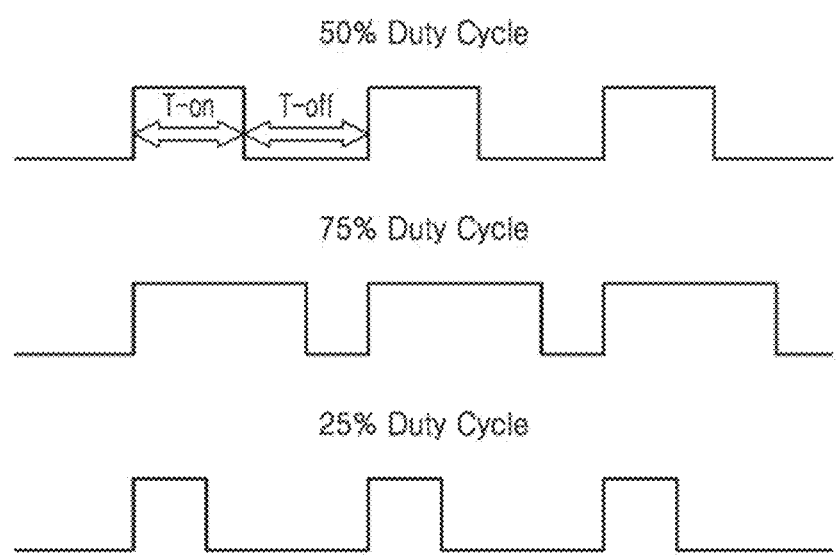
FIG. 14 is an example diagram depicting a process of reserving the RF grant based on a duty cycle of each stack of the UE, according to embodiments as disclosed herein.

FIG. 14 is an example diagram depicting a process of reserving the RF grant based on the duty cycle of each stack/SIM of the UE 206, according to embodiments as disclosed herein.

Consider an example scenario, wherein the UE 206 includes two stacks, a first stack supporting the LTE RAT (LTE stack) and a second stack supporting the NR RAT (NR stack). In such a scenario, the UE 206 allows both the LTE and NR stacks to reserve the RF grant for certain time based on the associated duty cycle, on completion of the at least one communication initiated in the second RAT 202b. The RF grant may be reserved for reception of the configuration of the secondary cell 204b of the first RAT 202a.

In an example, the UE 206 may determine the duty cycle for the LTE stack and the NR stack as 80% based on the signaling vs signaling parameter. In another example, the UE 206 determines the duty cycle for the LTE stack and the NR stack as 75%, based on the PS/connected vs cell search parameter. In another example, the UE 206 determines the duty cycle for the LTE stack and the NR stack based on the PS data vs signaling (registration) parameter. In such a scenario, one stack may continue the PS and other stack may perform the cell search and registration to use the RF win duty cycle fashion. The arbitration may be applied on both the stacks, so that both the stacks may use the RF. It is understood that embodiments herein are not limited to the above described examples of determining the duty cycle and may include two or more of various ways to determine the duty cycle (those described above) at the same time or contemporaneously.

Embodiments herein enable a User Equipment (UE) to perform faster camping in a wireless communication system by:

avoiding a delay in sending a measurement report due to no Radio Frequency (RF) grant in a Multi-Subscriber Identity Module (SIM) Multi Standby UE;

ensuring a reception of a reconfiguration message with a secondary cell measurement object and a configuration of the secondary cell by the UE from an associated primary cell; and providing better user experience and better throughput by enabling the UE to camp on the latest cell.

Embodiments disclosed herein may be implemented through at least one software program running on at least one hardware device and performing network management functions to control the elements. The elements shown in FIGS. 2-4, may be at least one of a hardware device, or a combination of hardware device and software module.

Embodiments disclosed herein describe methods and systems for enabling Multi-SIM UE to perform faster camping in wireless communication system. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in embodiments through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. Embodiments described herein could be implemented partly in hardware and partly in software. The inventive concepts may be implemented on different hardware devices, e.g., using a plurality of CPUs.

Conventional multi-SIM wireless devices experience an excessive amount of failed attempts to camp on a desired base station (e.g., a base station in a desired RAT) due to delay in completing IRAT measurement caused by waiting to receive a reconfiguration message. For example, the desired base station will terminate the IRAT measurement process if it does not receive the IRAT measurement report within a pre-defined or alternatively, given duration. Accordingly, when the conventional multi-SIM wireless devices are unable to send an IRAT measurement report within the duration, or are unable to receive a reconfiguration message from a desired base station (e.g., due to unavailable RF grant resulting from an RF resource being used by a different SIM/stack of the multi-SIM device), the attempt to camp on the desired base station fails. Thus, the conventional multi-SIM wireless devices spend excessive amounts of time camped on a less desirable base station (e.g., inferior with regards to signal quality, bandwidth, congestion, etc.), such as a base station in a legacy RAT.

However, according to embodiments, improved multi-SIM wireless devices are provided that reduce the delay in completing IRAT measurement and receiving the reconfiguration message. For example, the improved multi-SIM wireless devices perform IRAT measurement on one base station in a desired RAT and receive the reconfiguration message from a different base station in the desired RAT. Accordingly, the improved multi-SIM wireless devices are able to perform the IRAT measurement simultaneously or contemporaneously with waiting to receive the reconfiguration message. Thus, the improved multi-SIM wireless devices overcome the deficiencies of the conventional multi-SIM wireless devices to reduce IRAT measurement delay, and thereby reduce the number of failed attempts to camp on a desired base station.

According to embodiments, operations described herein as being performed by the wireless communication system 200, each of the RATs 202a-202n, the UE 206, the RAN 204, the master node 204a, the secondary node 204b, the camping manager 400, the measurement-based camping module 402, the RF grant based camping module 404, the indication-based camping module 406, and/or the duty cycle-based camping module 408 may be performed by processing circuitry. For example, operations described herein as being performed by the UE 206 may be performed by the processing circuitry 306.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing description of specific examples will so fully reveal the general nature of embodiments herein that others may, by applying current knowledge, readily modify and/or adapt for various applications such specific examples without departing from the generic concept, and, therefore, such adaptations and modifications should and are intended to be comprehended within the meaning and range of equivalents of embodiments. It is to be understood that the phraseology or terminology employed herein is for the purpose of description and not of limitation. Therefore, while embodiments herein have been described in terms of examples, those skilled in the art will recognize that the examples herein may be practiced with modification within the spirit and scope of embodiments as described herein.

We claim:

1. A method for performing camping in a wireless communication system, the method comprising:
   registering, by a user equipment (UE), with a primary cell of a first radio access technology (RAT) after terminating at least one communication service initiated in a second RAT;
   initiating, by the UE, inter-radio access technology (IRAT) measurement of a secondary cell before receiving a reconfiguration message from the primary cell in response to the registering, the secondary cell being associated with the primary cell; and
   sending, by the UE, an IRAT measurement report to the primary cell in response to receiving the reconfiguration message from the primary cell, the IRAT measurement report being based on the IRAT measurement.

2. The method of claim 1, wherein the UE supports multiple Subscriber Identity Modules (SIMs) and multi-rat dual connectivity (MRDC).

3. The method of claim 1, wherein the primary cell is an LTE base station (BS) supporting evolved UMTS terrestrial radio access network (E-UTRAN)-new radio (NR) dual connectivity (DC) (ENDC), and the secondary cell is a NR BS.

4. The method of claim 1, wherein the primary cell is a NR BS supporting NR-evolved universal terrestrial radio access (EUTRA)-DC (NEDC), and the secondary cell is an LTE BS.

5. The method of claim 1, further comprising:
   performing the IRAT measurement of the secondary cell for a duration to obtain the IRAT measurement report, the duration being based on previous configurations stored in a database;
   receiving the reconfiguration message from the primary cell, the reconfiguration message being related to measurements of the secondary cell; and
   receiving a configuration from the primary cell.

6. The method of claim 5, wherein one of,
   the primary cell is an LTE BS supporting ENDC, the secondary cell is an NR BS, and the IRAT measurement is a NR IRAT frequency measurement including an LTE to NR measurement, or
   the primary cell is an NR BS supporting NEDC, the secondary cell is an LTE BS, and the IRAT measurement is an LTE IRAT frequency measurement including an NR to LTE measurement; and
   the duration of the IRAT measurement is based on at least one of time taken for registering with the primary cell, a radio resource control (RRC) state of peer stacks, a number of NR or LTE frequencies, a number of SIMs or radio access technologies (RATs) supported by the UE, a reference signal received power (RSRP) of a previously measured NR or LTE cell, or an offset.

7. The method of claim 5, wherein one of:
   the previous configurations are stored in an NR frequency database for performing an NR IRAT frequency measurement, the primary cell is an LTE BS supporting ENDC, the secondary cell is an NR BS, and the NR IRAT frequency measurement is performed using a measurement gap configured for at least one of another measurement object, a connected mode discontinuous reception (C-DRX) mode, a DR mode, or another UE capable to measure without the measurement gap; or
   the previous configurations are stored in an LTE frequency database for performing an LTE IRAT frequency measurement, the primary cell is an NR BS supporting NEDC, the secondary cell is an LTE BS, and the LTE IRAT frequency measurement is performed using the measurement gap.

8. The method of claim 7, further comprising:
   updating the NR frequency database or the LTE frequency database based on at least one of a previously camped NR or LTE frequency, a first cell corresponding to an NR or LTE frequency, a location, or a signal strength of a second cell present in the location.

9. The method of claim 5, wherein one of:
   the configuration is an NR cell configuration, the primary cell is an LTE BS supporting ENDC, and the secondary cell is an NR BS; or
   the configuration is an LTE cell configuration, the primary cell is an NR BS supporting NEDC, and the secondary cell is an LTE BS.

10. The method of claim 1, further comprising:
    reserving a radio frequency (RF) grant before receiving the reconfiguration message from the primary cell.

11. The method of claim 10, wherein
    the reserving the RF grant includes reserving the RF grant for a duration in response to the registering with the primary cell;
    receiving the reconfiguration message from the primary cell, after the reserving the RF grant; and
    receiving a configuration from the primary cell.

12. The method of claim 11, wherein the reserving the RF grant includes:
    retaining RF resources for at least one SIM among a plurality of SIMs included in the UE, the at least one SIM corresponding to the secondary cell; and
    releasing the RF resources for another SIM among the plurality of SIMs, the other SIM not included among the at least one SIM.

13. The method of claim 1, further comprising:
    receiving an indication from the primary cell about a follow-on radio resource control (RRC) procedure in response to the registering with the primary cell; and
    reserving an RF grant in response to the receiving the indication.

14. The method of claim 1, further comprising:
    camping on the secondary cell based on a duty cycle of each SIM among a plurality of SIMs included in the UE.

15. The method of claim 14, wherein the camping on the secondary cell comprises:
    reserving an RF grant for a duration corresponding to each of the plurality of SIMs of the UE based on the duty cycle.

16. A user equipment (UE) in a wireless communication system, the UE comprising:
    processing circuitry configured to,
    register with a primary cell of a first radio access technology (RAT) after terminating at least one communication service initiated in a second RAT;
    initiate inter-radio access technology (IRAT) measurement of a secondary cell before receiving a reconfiguration message from the primary cell in response to the registration, the secondary cell being associated with the primary cell; and
    send an IRAT measurement report to the primary cell in response to receiving the reconfiguration message from the primary cell, the IRAT measurement report being based on the IRAT measurement.

17. The UE of claim 16, wherein
the UE is a multi-subscriber identity module (SIM) multi standby UE; and
the UE is multi-RAT dual connectivity (MRDC) capable UE.

18. The UE of claim 16, wherein the primary cell is an LTE base station (BS) (LTE BS) supporting evolved UMTS terrestrial radio access network (EUTRAN)-new radio (NR) dual connectivity (DC) (ENDC), and the secondary cell is a NR BS.

19. The UE of claim 16, wherein the primary cell is a NR BS supporting NR-evolved universal terrestrial radio access (EUTRA)-DC (NEDC), and the secondary cell is an LTE BS.

20. The UE of claim 16, wherein the processing circuitry is configured to:
perform the IRAT measurement of the secondary cell for a duration to obtain an the IRAT measurement report, the duration being based on previous configurations stored in a database;
receive the reconfiguration message from the primary cell, the reconfiguration message being related to measurements of the primary cell; and
receive a configuration from the primary cell.

* * * * *